(12) United States Patent
Tang et al.

(10) Patent No.: US 11,075,845 B2
(45) Date of Patent: *Jul. 27, 2021

(54) SYSTEM AND METHOD OF SITE TRAFFIC CONTROL

(71) Applicant: eBay Inc., San Jose, CA (US)

(72) Inventors: Yu Tang, Round Rock, TX (US); Bryant Genepang Luk, Round Rock, TX (US); Jennifer T. Robertson, Cedar Park, TX (US); Robert He, Pflugerville, TX (US); Christopher Diebold O'Toole, Cedar Park, TX (US); Jason Ziaja, Cedar Park, TX (US); Ananya Das, Austin, TX (US); Jun Ho Cho, Seoul (KR); Zi Won Ahn, Seoul (KR)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,125

(22) Filed: Dec. 28, 2018

(65) Prior Publication Data

US 2019/0166056 A1  May 30, 2019

Related U.S. Application Data

(63) Continuation of application No. 15/587,070, filed on May 4, 2017, now Pat. No. 10,205,669, which is a
(Continued)

(51) Int. Cl.
*H04L 12/841* (2013.01)
*H04L 12/801* (2013.01)
(Continued)

(52) U.S. Cl.
CPC ............. *H04L 47/28* (2013.01); *H04L 43/00* (2013.01); *H04L 47/11* (2013.01); *H04L 47/127* (2013.01);
(Continued)

(58) Field of Classification Search
CPC ..... H04L 43/00; H04L 43/0894; H04L 47/11; H04L 47/127; H04L 47/24; H04L 47/26;
(Continued)

(56) References Cited

U.S. PATENT DOCUMENTS 6,049,547 A   4/2000 Fisher et al.
6,308,211 B1  10/2001 Rosborough et al.
(Continued)

FOREIGN PATENT DOCUMENTS

CN   102668639 A   9/2012
CN   103475595 A   12/2013
(Continued)

OTHER PUBLICATIONS

Extended European Search report received for European Patent Application No. 16793179.9, dated Feb. 26, 2018, 7 pages.
(Continued)

*Primary Examiner* — Asad M Nawaz
*Assistant Examiner* — Kai Chang
(74) *Attorney, Agent, or Firm* — FIG. 1 Patents

(57) ABSTRACT

Systems and methods of site traffic control are disclosed. In some example embodiments, a request for an online service to perform an operation is received from a user on a client device, and at least one overload condition for the online service is detected, or otherwise determined, with the overload condition(s) corresponding to a request time of the request. A standard of restriction is selected from a plurality of standards of restriction based on the overload condition(s), and the selected standard of restriction is used as a basis for either denying or permitting the user access to the operation of the online service.

20 Claims, 18 Drawing Sheets

Related U.S. Application Data continuation of application No. 14/708,463, filed on May 11, 2015, now Pat. No. 9,647,950.

(51) Int. Cl.
*H04L 12/825* (2013.01)
*H04L 29/08* (2006.01)
*H04L 12/26* (2006.01)
*H04L 12/851* (2013.01)

(52) U.S. Cl.
CPC .............. *H04L 47/24* (2013.01); *H04L 47/26* (2013.01); *H04L 67/00* (2013.01); *H04L 67/146* (2013.01); *H04L 67/325* (2013.01); *H04L 43/0894* (2013.01)

(58) Field of Classification Search
CPC ....... H04L 47/28; H04L 67/00; H04L 67/146; H04L 67/325; B62D 6/02
See application file for complete search history.

(56) References Cited

U.S. PATENT DOCUMENTS

| | | | |
|---|---|---|---|
| 6,700,876 B1 | 3/2004 | DiNicola et al. | |
| 6,728,363 B2 | 4/2004 | Lieberman et al. | |
| 7,000,013 B2* | 2/2006 | Mei | H04L 41/5025 709/223 |
| 7,516,231 B2 | 4/2009 | Langer et al. | |
| 7,734,648 B2 | 6/2010 | Eberlein | |
| 8,290,838 B1 | 10/2012 | Thakur et al. | |
| 8,509,085 B2 | 8/2013 | Bader et al. | |
| 8,621,554 B1* | 12/2013 | Yu | H04W 4/21 726/1 |
| 9,071,576 B1* | 6/2015 | Earl | H04L 63/1466 |
| 9,258,736 B2 | 2/2016 | Xiao | |
| 9,397,978 B1* | 7/2016 | Cha | H04L 63/0236 |
| 9,647,950 B2 | 5/2017 | Tang | |
| 10,205,669 B2 | 2/2019 | Tang et al. | |
| 10,284,643 B2* | 5/2019 | El-Charif | H04L 43/16 |
| 2002/0057686 A1 | 5/2002 | Leon | |
| 2003/0055882 A1* | 3/2003 | Kawamura | H04L 69/163 709/203 |
| 2003/0137938 A1 | 7/2003 | Belanger et al. | |
| 2004/0165531 A1 | 8/2004 | Brady | |
| 2008/0075003 A1 | 3/2008 | Lee et al. | |
| 2009/0265453 A1 | 10/2009 | Hirano et al. | |
| 2010/0061238 A1 | 3/2010 | Godbole et al. | |
| 2010/0302950 A1 | 12/2010 | Zhao | |
| 2011/0078321 A1 | 3/2011 | Muret et al. | |
| 2012/0115436 A1* | 5/2012 | Dai | H04W 48/06 455/410 |
| 2012/0209945 A1 | 8/2012 | Chandrasekhar et al. | |
| 2012/0263036 A1 | 10/2012 | Barclay et al. | |
| 2012/0293007 A1 | 11/2012 | Byun et al. | |
| 2014/0045517 A1 | 2/2014 | Marti et al. | |
| 2014/0052835 A1* | 2/2014 | Felton | H04L 41/0686 709/223 |
| 2014/0263263 A1 | 9/2014 | Decapua | |
| 2014/0269275 A1 | 9/2014 | Jun et al. | |
| 2014/0330870 A1 | 11/2014 | Lissack et al. | |
| 2014/0358994 A1* | 12/2014 | Liu | H04L 67/26 709/203 |
| 2014/0362697 A1 | 12/2014 | Desnoyer | |
| 2015/0049869 A1 | 2/2015 | Petrovykh et al. | |
| 2015/0088697 A1* | 3/2015 | Garnepudi | G06Q 30/0637 705/26.82 |
| 2015/0156132 A1 | 6/2015 | Emejulu et al. | |
| 2015/0215814 A1* | 7/2015 | Raleigh | H04L 12/1496 370/231 |
| 2015/0277964 A1* | 10/2015 | Atkins | G06Q 40/00 718/101 |
| 2016/0095059 A1 | 3/2016 | Salvador et al. | |
| 2016/0337253 A1 | 11/2016 | Tang et al. | |
| 2017/0237674 A1 | 8/2017 | Tang et al. | |

FOREIGN PATENT DOCUMENTS

| | | |
|---|---|---|
| CN | 103888368 A | 6/2014 |
| CN | 104010325 A | 8/2014 |
| CN | 104054377 A | 9/2014 |
| CN | 107534586 A | 1/2018 |
| EP | 1087596 A2 | 3/2001 |
| WO | 2009/054978 A1 | 4/2009 |
| WO | 2016/182768 A1 | 11/2016 |

OTHER PUBLICATIONS

International Preliminary Report on Patentability received for PCT Application No. PCT/US2016/030086, dated Nov., 23, 2017, 6 pages.
International Search Report received for PCT Patent Application No. PCT/US2016/030086, dated Aug. 4, 2016, 2 pages.
Written Opinion received for PCT Patent Application No. PCT/US2016/030086, dated Aug. 4, 2016, 4 pages.
Response to European Search Report filed on Sep. 24, 2018 for European Patent Application No. 16793179.9, dated Feb. 26, 2018, 31 pages.
Notice of Allowance received for U.S. Appl. No. 14/708,463, dated Jan. 4, 2017, 12 pages.
Corrected Notice of Allowability received for U.S. Appl. No. 15/587,070, dated Oct. 22, 2018, 5 pages.
First Action Interview—Pre-interview Communication received for U.S. Appl. No. 15/587,070, dated Jan. 25, 2018, 4 pages.
Preliminary Amendment received for U.S. Appl. No. 15/587,070, filed May 25, 2017, 9 pages.
Notice of Allowance received for U.S. Appl. No. 15/587,070, dated Jun. 5, 2018, 11 pages.
Notice of Allowance received for U.S. Appl. No. 15/587,070, dated Sep. 24, 2018, 9 pages.
Office Action received for Korean Patent Application No. 10-2017-7035487, dated Apr. 1, 2019, 4 pages (2 Pages of English Translations and 4 Pages of Official Copy).
Response to Office Action Filed on May 31, 2019 for Korean Patent Application No. 10-2017-7035487 dated Apr. 1, 2019, 12 pages(7 pages of official copy & 5 pages of English Claims).
Response to Office Action filed on Jul. 17, 2020 for Chinese Patent Application No. 201680027703.0, dated Apr. 3, 2020, 12 pages (6 pages of official copy & 6 pages of English Translation of claims).
Notice of Decision to Grant received for Chinese Patent Application No. 201680027703.0, dated Nov. 5, 2020, 8 pages (4 pages of Official copy & 4 pages of English translation).
Communication Under Rule 71(3) EPC received for European Patent Application No. 16793179.9, dated Apr. 6, 2020, 69 Pages.
Response to Communication Under Rule 71(3) EPC filed on Jun. 18, 2020 for European Patent Application No. 16793179.9, dated Apr. 6, 2020, 11 pages.
Office Action received for Chinese Patent Application No. 201680027703.0, dated Apr. 3, 2020, 19 pages (8 Pages of Official Copy and 11 Pages of English Translation).

\* cited by examiner

400

| TOKEN | RETURN TIME PARAMETER |
|---|---|
| 1738292 | 10:30 AM – 12:30 PM |
| 8307623 | 10:45 AM – 12:45 PM |
| 4265988 | 11:00 AM – 1:00 PM |
| . . . | . . . |

*FIG. 4*

SYSTEM AND METHOD OF SITE TRAFFIC CONTROL

PRIORITY

This application is a continuation of U.S. application Ser. No. 15/587,070, filed May 4, 2017, which is a continuation of U.S. patent application Ser. No. 14/708,463, filed on May 11, 2015, each of which is hereby incorporated by reference in its entirety.

TECHNICAL FIELD

Embodiments of the present disclosure relate generally to data processing and, more particularly, but not by way of limitation, to systems and methods of site traffic control.

BACKGROUND

Online services (e.g., websites) can suffer from a high volume of user traffic (e.g., requests). High volume traffic can overwhelm an online service and result in a server shutdown or other service failure.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 4 illustrates a table comprising associations in a database between tokens and corresponding return time parameters, in accordance with some example embodiments.

Figure 1:
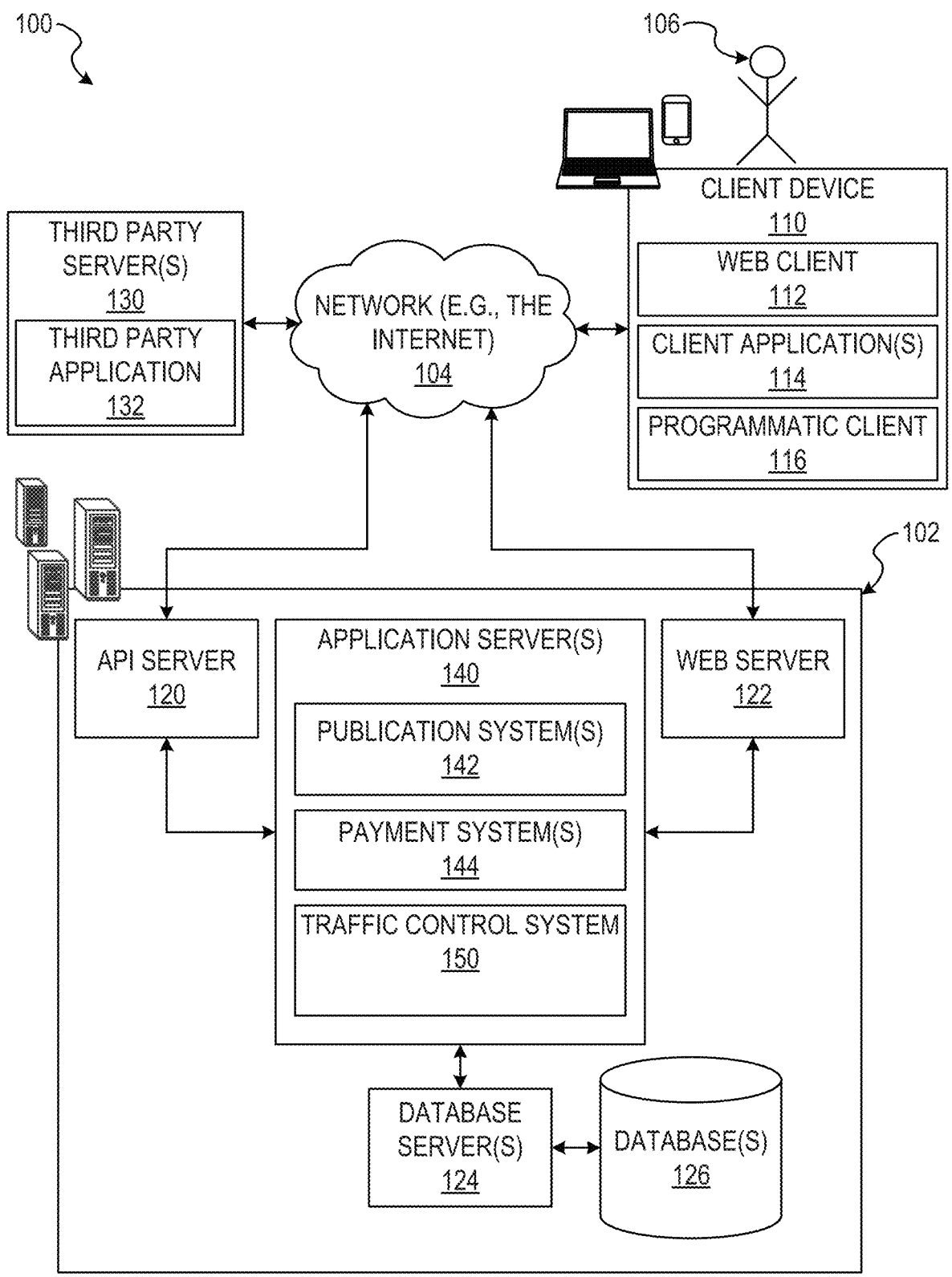
FIG. 1 is a block diagram illustrating a networked system, in accordance with some example embodiments.

The headings provided herein are merely for convenience and do not necessarily affect the scope or meaning of the terms used.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for managing traffic for an online service. In some example embodiments, a traffic control system implements a queueing system around an application of an online service. When traffic control system determines that the application has reached its capacity or is within a predetermined range of reaching its capacity, the traffic control system can then issue, to a user submitting a request to the online service, a token and an estimated time parameter, such as a window of time, for the user to attempt submitting another request. The estimated time can correspond to a time determined by the traffic control system to be when the application can better handle the request (e.g., when the application is not at capacity). When the user with the token submits a subsequent request in accordance with the time parameter (e.g., within the window of time), the traffic control system can service that request ahead of other requests. In this fashion, the traffic control system can avoid overloading the online service and can provide an estimated wait time for the user. The traffic control system can also notify the user, at the occurrence of or at a predetermined amount of time before the estimated time parameter, that the user can attempt to submit the request again and expect a quick response.

In some example embodiments, the traffic control system can determine a level of the degree to which the online service is overloaded. The traffic control system can then generate different types of overload notifications to present to a user based on the determined level. The traffic control system can also determine a standard of restriction based on the determined level, and then apply the determined standard of restriction in determining which user requests to satisfy and which user requests to temporarily deny.

Systems and methods of site traffic control are disclosed herein. In some example embodiments, a first request for an online service to perform an operation is received from a first user on a first client device, and at least one overload condition for the online service is detected, or otherwise determined, with the overload condition(s) corresponding to a first request time of the first request. A first token and a first return time parameter for the first user are determined based on the determination of the overload condition, and the first token is stored in association with the first return time parameter. The first token and the first return time parameter are transmitted to the first client device. A second request for the online service to perform the operation is received from the first user. The second request has a corresponding time and comprises the first token. The first return time parameter is identified based on the first token. A determination is made that the corresponding time of the second request satisfies the first return time parameter, and the operation is performed in response to, or otherwise based on, the determination that the corresponding time of the second request satisfies the first return time parameter. Variations on the operations recited above, as well as other embodiments, are also within the scope of the present disclosure.

In some example embodiments, the operation comprises enabling the first user to access a page of the online service. In some example embodiments, the overload condition(s) comprises at least one of a traffic level of the online service satisfying one or more predetermined traffic level criteria, a network connection speed of the online service satisfying one or more predetermined network connection speed criteria, and a server speed of the online service satisfying one or more predetermined server speed criteria.

In some example embodiments, the first return time parameter comprises a specified time or a specified window of time. In some example embodiments, determining the first return time parameter comprises estimating a load level of the online service for a future time, the future time being subsequent to the first request time, determining that the estimated load level satisfies one or more return time criteria, and defining the first return time parameter to include the future time based on the determining that the estimated load level satisfies the one or more return time criteria.

In some example embodiments, transmitting the first token to the first client device comprises transmitting a cookie to the first client device, the cookie comprising the first token.

In some example embodiments, a determination is made that a current time is within a predetermined amount of time of the first return time parameter, and a return time notification is transmitted to the first user based on the determining that the current time is within the predetermined amount of time of the first return time parameter, with the return time notification being configured to indicate to the first user to request the operation again.

In some example embodiments, an overload level is selected from a plurality of overload levels based on the at least one overload condition, an overload notification is generated based on the selected overload level, with the overload notification comprising an indication of the overload level, and the overload notification is caused to be displayed on the first client device.

In some example embodiments, a standard of restriction is selected from a plurality of standards of restriction based on the at least one overload condition, the first user is denied access to the operation of the online service based on the selected standard of restriction, and a second user is allowed access to the operation of the online service based on the selected standard of restriction.

The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to perform the instructions.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The traffic control system 150 may provide functionality operable to perform various traffic control operations, as will be discussed in further detail below. The traffic control system 150 may access the data from the databases 126, the third party servers 130, the publication system 120, and other sources. In some example embodiments, the traffic control system 150 may analyze the data to perform traffic control operations. In some example embodiments, the traffic control system 150 may communicate with the publication systems 120 (e.g., accessing item listings) and payment system 122. In an alternative embodiment, the traffic control system 150 may be a part of the publication system 120.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and traffic control system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
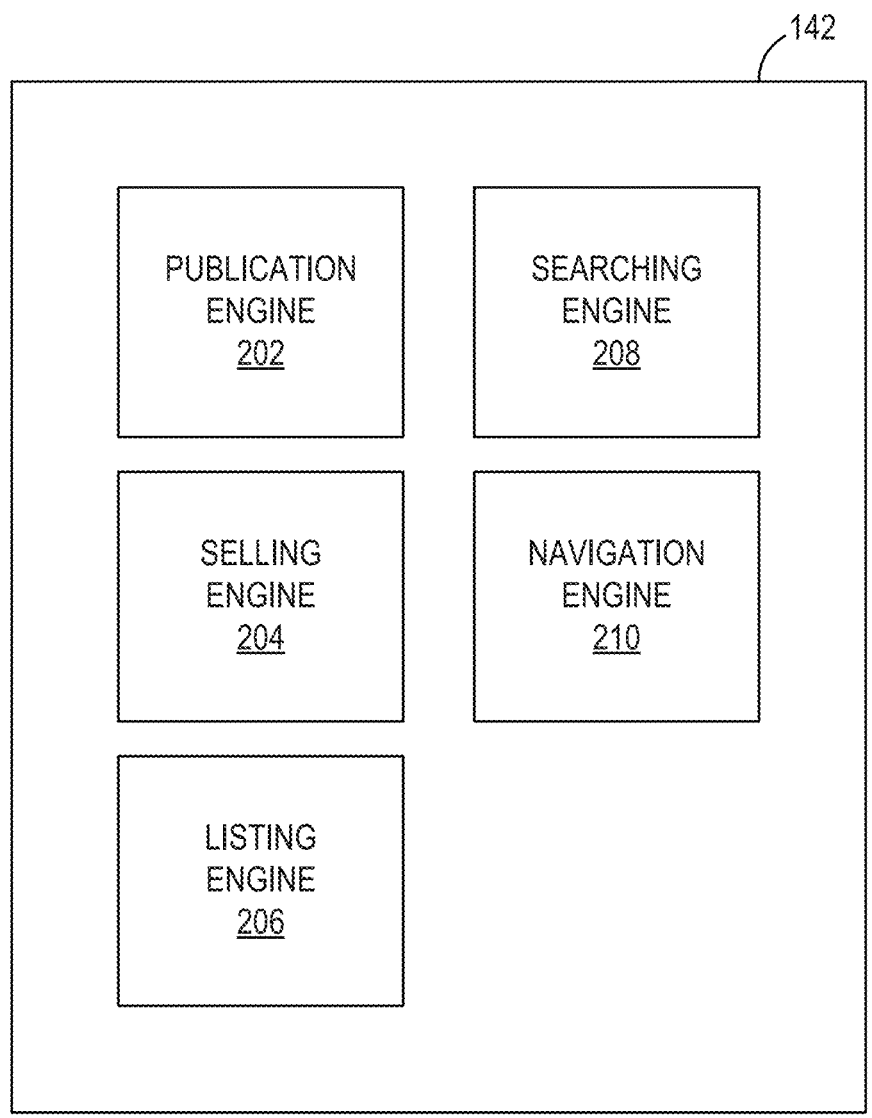
FIG. 2 is a block diagram illustrating various components of a network-based publication system, in accordance with some example embodiments.

FIG. 2 is a block diagram illustrating various components of the network-based publication system 142, in accordance with some example embodiments. The publication system 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components can access one or more databases 126 via the database servers 124.

The publication system 142 can provide a number of publishing, listing, and/or price-setting mechanisms whereby a seller (also referred to as a first user) can list (or publish information concerning) goods or services for sale or barter, a buyer (also referred to as a second user) can express interest in or indicate a desire to purchase or barter such goods or services, and a transaction (such as a trade) can be completed pertaining to the goods or services. To this end, the publication system 142 can comprise at least one publication engine 202 and one or more selling engines 204. The publication engine 202 can publish information, such as item listings or product description pages, on the publication system 142. In some embodiments, the selling engines 204 can comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines can also provide a number of features in support of these auction-format listings, such as a reserve price feature whereby a seller can specify a reserve price in connection with a listing and a proxy-bidding feature whereby a bidder can invoke automated proxy bidding. The selling engines 204 can further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the publication system 142. In some embodiments, the listings can be an offer, deal, coupon, or discount for the good or service. Each good or service is associated with a particular category. The listing engine 206 can receive listing data such as title, description, and aspect name/value pairs. Furthermore, each listing for a good or service can be assigned an item identifier. In other embodiments, a user can create a listing that is an advertisement or other form of information publication. The listing information can then be stored to one or more storage devices coupled to the publication system 142 (e.g., databases 126). Listings also can comprise product description pages that display a product and information (e.g., product title, specifications, and reviews) associated with the product. In some embodiments, the product description page can include an aggregation of item listings that correspond to the product described on the product description page.

The listing engine 206 can also allow buyers to conveniently author listings or requests for items desired to be purchased. In some embodiments, the listings can pertain to goods or services that a user (e.g., a buyer) wishes to transact via the publication system 142. Each good or service is associated with a particular category. The listing engine 206 can receive as much or as little listing data, such as title, description, and aspect name/value pairs, that the buyer is aware of about the requested item. In some embodiments, the listing engine 206 can parse the buyer's submitted item information and can complete incomplete portions of the listing. For example, if the buyer provides a brief description of a requested item, the listing engine 206 can parse the description, extract key terms and use those terms to make a determination of the identity of the item. Using the determined item identity, the listing engine 206 can retrieve additional item details for inclusion in the buyer item request. In some embodiments, the listing engine 206 can assign an item identifier to each listing for a good or service.

In some embodiments, the listing engine 206 allows sellers to generate offers for discounts on products or services. The listing engine 206 can receive listing data, such as the product or service being offered, a price and/or discount for the product or service, a time period for which the offer is valid, and so forth. In some embodiments, the listing engine 206 permits sellers to generate offers from the sellers' mobile devices. The generated offers can be uploaded to the publication system 142 for storage and tracking.

Searching the publication system 142 is facilitated by a searching engine 208. For example, the searching engine 208 enables keyword queries of listings published via the publication system 142. In example embodiments, the searching engine 208 receives the keyword queries from a device of a user and conducts a review of the storage device storing the listing information. The review will enable compilation of a result set of listings that can be sorted and returned to the client device 110 of the user. The searching engine 208 can record the query (e.g., keywords) and any subsequent user actions and behaviors (e.g., navigations).

The searching engine 208 also can perform a search based on the location of the user. A user can access the searching engine 208 via a mobile device and generate a search query. Using the search query and the user's location, the searching engine 208 can return relevant search results for products, services, offers, auctions, and so forth to the user. The searching engine 208 can identify relevant search results both in a list form and graphically on a map. Selection of a graphical indicator on the map can provide additional details regarding the selected search result. In some embodiments, the user can specify as part of the search query a radius or distance from the user's current location to limit search results.

The searching engine 208 also can perform a search based on an image. The image can be taken from a camera or imaging component of a client device or can be accessed from storage.

In a further example, a navigation engine 210 allows users to navigate through various categories, catalogs, or inventory data structures according to which listings can be classified within the publication system 142. For example, the navigation engine 210 allows a user to successively navigate down a category tree comprising a hierarchy of categories (e.g., the category tree structure) until a particular set of listings is reached. Various other navigation applications within the navigation engine 210 can be provided to supplement the searching and browsing applications. The navigation engine 210 can record the various user actions (e.g., clicks) performed by the user in order to navigate down the category tree.

Figure 3:
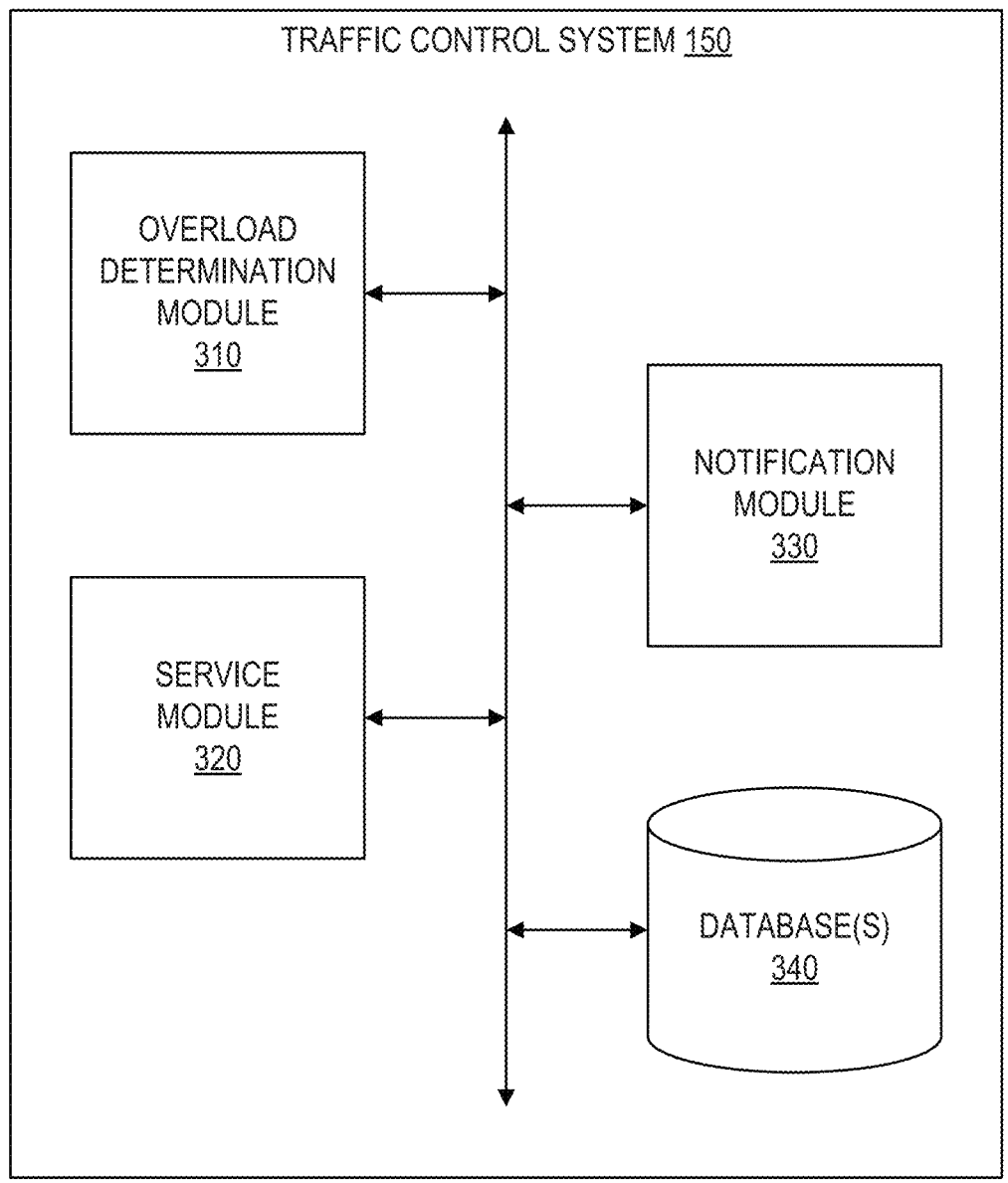
FIG. 3 is a block diagram illustrating components of a traffic control system, in accordance with some example embodiments.

FIG. 3 is a block diagram illustrating components of the traffic control system 150, in accordance with some example embodiments. In some example embodiments, the traffic control system 150 comprises any combination of one or more of an overload determination module 310, a service module 320, and a notification module 330. The traffic control system 150 can also comprise one or more databases 340. The overload determination module 310, the service module 320, the notification module 330, and the database(s) 340 can be communicatively coupled to each other, and can reside on and be implemented by a machine having a memory and at least one processor. These components of the traffic control system 150 can also reside on separate machines. Database(s) 340 can be incorporated into database(s) 126 of FIG. 1.

In some example embodiments, the overload determination module 310 is configured to receive, from a first user (e.g., user 106 in FIG. 1) on a first client device (e.g., client device 110 in FIG. 1), a first request for an online service to perform an operation. The online service can comprise a website, in some example embodiments, the online service comprises any service provided by the publication system(s) 142 or the payment system(s) 144 in FIG. 1. However it is contemplated that other types of online services are also within the scope of the present disclosure. The operation can comprise allowing access to a page (e.g., a page on which to view details of an item, a page on which to order or purchase an item) of the online service to the first user, presenting a page of the online service to the first user on the first client device, or processing an order or transaction for an item. However, other types of operations are also within the scope of the present disclosure.

In some example embodiments, the overload determination module 310 is further configured to detect at least one overload condition for the online service. The overload condition(s) can comprise any condition that would cause the online service to have reduced performance of one or more specified functions to at least a predetermined degree in response to the online service performing the specified function(s) for an additional user. Such overload conditions can include, but are not limited to, conditions related to a status and/or capacity of one or more databases of the online service, conditions related to a status and/or capacity of one or more servers of the online service, and conditions related to a status and/or capacity of a network of the online service. For example, in some example embodiments, the overload condition(s) can comprise at least one of a traffic level of the online service (e.g., a number of requests being processed during a particular time period, a number of requests being congested or stagnant during a particular time period) satisfying one or more predetermined traffic level criteria (e.g., exceed a predetermined threshold), a network connection speed of the online service satisfying one or more predetermined network connection speed criteria (e.g., the network connections speed is below a predetermined threshold), a server speed of the online service satisfying one or more predetermined server speed criteria (e.g., the server speed is below a predetermined threshold), and a determination of the number of available resources (e.g., databases, servers) of the online service. However, other types of overload conditions are also within the scope of the present disclosure.

In some example embodiments, the overload condition(s) corresponds to a request time at which the corresponding request is received by the overload determination module 310. For example, if a request is received by the overload determination module 310 at 8:43 AM, the overload condition(s) can be determined for 8:43 AM. In another example, overload conditions can be determined periodically by the overload determination module 310 independent of receiving a request, and then the overload condition(s) that have been determined at a time nearest to the reception of a request can be determined to be the overload condition(s) for that request.

In some example embodiments, the overload determination module 310 is further configured to perform one or more monitoring operations to determine any overload conditions. Examples of monitoring techniques that can be employed within the scope of the present disclosure include, but are not limited to, synthetic monitoring techniques. Synthetic monitoring comprises monitoring that is performed using a browser emulation or scripted recordings of web transactions, where behavioral scripts (or paths) are used to simulate an action or path that an end-user would take on a website or other online service. Those paths are then continuously monitored at specific intervals for performance (e.g., availability). Other types of monitoring techniques are also within the scope of the present disclosure. It is contemplated that the overload determination module 410 can perform monitoring techniques, such as synthetic monitoring, itself, or can alternatively receive an indication of an overload condition from an external source that performs such monitoring techniques.

In some example embodiments, the overload determination module 310 is configured to prevent the performance of the requested operation by the online service in response to, or otherwise based on, the determination of the overload condition(s). In some example embodiments, the overload determination module 310 is further configured to determine a first token and a first return time parameter for the first user based on the determination of the overload condition(s). The first token can comprise an identifier, such as a randomly generated number or alpha-numeric text. The first return time parameter can comprise any time condition that is to be satisfied in order for the online service to perform the requested operation for the first user. In some example embodiments, the first return time parameter comprises a specified time (e.g., 10:30 AM), such that the online service will perform the requested operation for the first user if the first user requests the operation again after the specified time has been reached. In some example embodiment, the first return time parameter comprises a specified window of time (e.g., 10:30 AM-12:30 PM), such that the online service will perform the requested operation for the first user if the first user requests the operation again within the specified window of time. However, it is contemplated that other return time parameters are also within the scope of the present disclosure.

In some example embodiments, the overload determination module 310 is further configured to determine the first return time parameter based on a determination of the soonest time at which one or more return time criteria can be satisfied. The return time criteria can represent criteria that indicated that the online service can adequately process the first user's request. This determination can be based on one or more factors, such as an estimated prediction of traffic flow, activity level, or other status indicators of the online service at future times. For example, the overload determination module 310 can estimate the soonest time at which its traffic flow will drop below a predetermined threshold, and then determine the first return time parameter based on that soonest time, such as making that soonest time the beginning of the window of time. Then ending of the window of time can be based on an estimate of the demand for the online service at future times as well.

In some example embodiments, the overload determination module 310 is configured to estimate a load level of the online service for a future time, determine that the estimated load level satisfies one or more return time criteria, and then define the first return time parameter to include the future time based on the determination that the estimated load level satisfies the one or more return time criteria.

In some example embodiments, the overload determination module 310 is further configured to store the first token in the database(s) 340 in association with the first return time parameter. FIG. 4 illustrates a table 400 comprising store associations in the database(s) 340 between tokens and corresponding return time parameters, in accordance with some example embodiments.

Referring back to FIG. 3, in some example embodiments, the notification module 330 is configured to transmit the first token and the first return time parameter to the first client device. The notification module 330 can be configured to transmit a cookie to the first client device, with the cookie comprising the first token.

In some example embodiments, the overload determination module 310 is further configured to receive, from the first user, a second request for the online service to perform the operation at a corresponding time. The first token is received in association with the second request (e.g., via the cookie stored on the first client device).

In some example embodiments, the overload determination module 310 is further configured to identify the first return time parameter based on the first token received in association with the second request. The overload determination module 310 can identify the first return time parameter by looking up the first token stored in the database 340 and determining the first return time parameter that is stored in association with the first token.

In some example embodiments, the overload determination module 310 is further configured to determine whether or not the corresponding time of the second request satisfies the first return time parameter. For example, if the first return time parameter is a window of 10:30 AM-12:30 PM, and the corresponding time of the second request is 10:22 AM, then the overload determination module 310 would determine that the corresponding time of the second request does not satisfy the first return time parameter. On the other hand, given the same first return time parameter, if the corresponding time of the second request is 10:42 AM, then the overload determination module 310 would determine that the corresponding time of the second request does satisfy the first return time parameter.

In some example embodiments, the service module 320 is configured to perform the requested operation in response to the determination that the corresponding time of the second request satisfies the first return time parameter, and to prevent performance of the requested operation in response to the determination that the corresponding time of the second request does not satisfy the first return time parameter.

Figure 5:
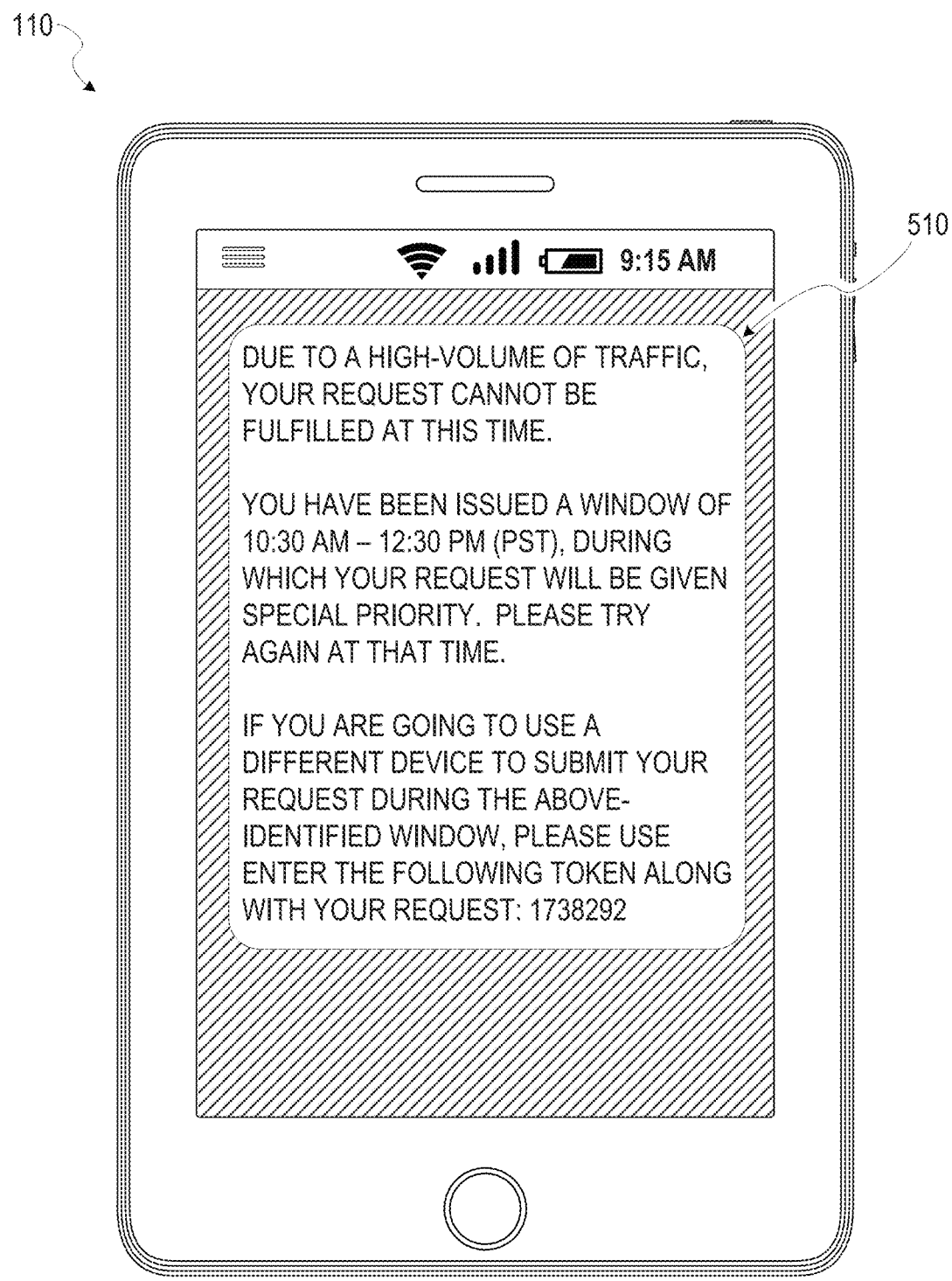
FIG. 5 illustrates an overload notification displayed on a client device, in accordance with some example embodiments.

In some example embodiments, the notification module 310 is configured to generate and transmit to the first client device an overload notification. FIG. 5 illustrates an overload notification 510 displayed on a client device 110, in accordance with some example embodiments. Although FIG. 5 shows client device 110 as a smartphone, it is contemplated that other types of client devices are also within the scope of the present disclosure, as previously discussed.

The overload notification 510 can comprise an indication that the online service cannot process the first user's request at the current time. The overload notification 510 can also comprise an indication of the overload condition(s) that have caused the online service not to be able to fulfill the first user's request. The overload notification 510 can further comprise the first return time parameter and an indication that the request of the first user will be given priority if it is re-submitted in accordance with the first return time parameter.

In certain situations, the first user may decide to re-submit the request using a different client device than originally used. Therefore, since the subsequent different client device might not have the first token stored on it and available to provide in association with the second request, the overload notification 510 can comprise an indication of the first token for the first user to manually submit in association with the second request.

In some example embodiments, the notification module 330 is further configured to determine that a current time is within a predetermined amount of time of the first return time parameter, and to transmit a return time notification to the first user based on the determination that the current time is within the predetermined amount of time of the first return time parameter, thereby notifying the first user either shortly before the first return time parameter (e.g., 5 minutes before the specified window of time) or at the time of the first return time parameter (e.g., at the beginning of the specified window of time).

Figure 6:
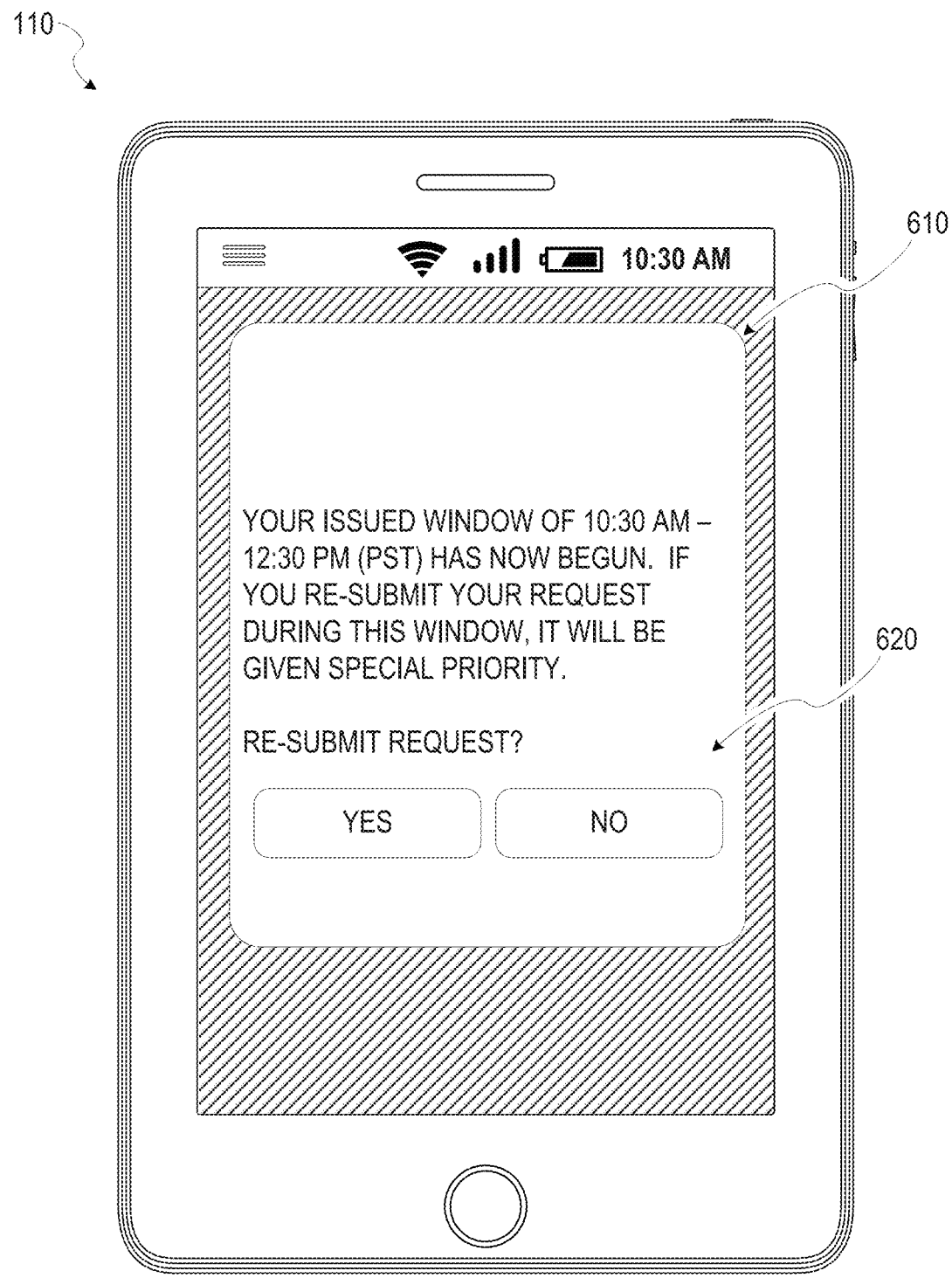
FIG. 6 illustrates a return time notification displayed on a client device, in accordance with some example embodiments.

FIG. 6 illustrates a return time notification 610 displayed on a client device 110, in accordance with some example embodiments. Although FIG. 6 shows client device 110 as a smartphone, it is contemplated that other types of client devices are also within the scope of the present disclosure, as previously discussed.

The return time notification 610 can be configured to indicate to the first user to request the operation again. The return time notification 610 can also be configured to indicate to the first user that the re-submitted request will be given special priority ahead of requests of other users or that the re-submitted request is guaranteed to be processed fully upon submission by the first user. In some example embodiments, the return time notification 610 also comprises one or more selectable user interface elements 620 configured to provide the first user with the option of re-submitting the request to the online service. One of the user interface elements 620 corresponding to re-submission of the request can be configured to trigger, or otherwise initiate, re-submission of the request in response to its selection. In some example embodiments, selection of the user interface element 620 corresponding to re-submission of the request triggers, or otherwise initiates, loading of a page on which the first user can re-submit the request.

Referring back to FIG. 3, in some example embodiments, the overload determination module 310 is further configured to select an overload level from a plurality of overload levels based on the overload condition(s). The overload level can be determined based on a calculation of an estimated response time by a load calculator of the overload determination module 310. The response time can be calculated based on the overload condition(s). In some example embodiments, the overload determination module 310 employs a model in estimating the response time, where the model associates certain overload conditions with certain amounts of time that can be summed in calculating the overall response time of the online service for a particular set of one or more overload conditions. In this respect, the overload determination module 310 can categorize the status of the online service in terms of the degree to which performance of the requested operation is going to be delayed.

In some example embodiment, the plurality of overload levels can correspond to different ranges of estimated response times. For example, the plurality of overload levels can comprise a high overload level, a medium overload level, and a low overload level. The low overload level can be selected for estimated response times between 1 minute and 15 minutes, the medium overload level can be selected for estimated response times between 15 minutes and 45 minutes, and the high overload level can be selected for any estimated response times above 45 min.

In some example embodiments, the plurality of overload levels can correspond to different numbers of overload conditions that are detected. As previously discussed, the overload conditions can comprise any condition that would cause the online service to have reduced performance of one or more specified functions to at least a predetermined degree. Such overload conditions can include, but are not limited to, conditions related to a status and/or capacity of a database of the online service, conditions related to a status and/or capacity of a server of the online service, and conditions related to a status and/or capacity of a network of the online service. Examples of overload conditions include, but are not limited to, a traffic level of the online service (e.g., a number of requests being processed during a particular time period, a number of requests being congested or stagnant during a particular time period) satisfying one or more predetermined traffic level criteria (e.g., exceed a predetermined threshold), a network connection speed of the online service satisfying one or more predetermined network connection speed criteria (e.g., the network connections speed is below a predetermined threshold), and a server speed of the online service satisfying one or more predetermined server speed criteria (e.g., the server speed is below a predetermined threshold). The overload determination module 310 can be configured to determine how many overload conditions apply during the time of the request for the performance of the operation, and then to determine the overload level based on the determined number of overload conditions. For example, the low overload level can be selected based on one overload condition being detected, the medium overload level can be selected based on two overload conditions being detected, and the high overload level can be selected based on three of ore overload conditions being detected. Other configurations are also within the scope of the present disclosure.

In some example embodiments, the notification module 330 is further configured to generate an overload notification based on the selected overload level, and to cause the overload notification to be displayed on the first client device. The overload notification can comprise an indication of the determined overload level.

Figure 7A:
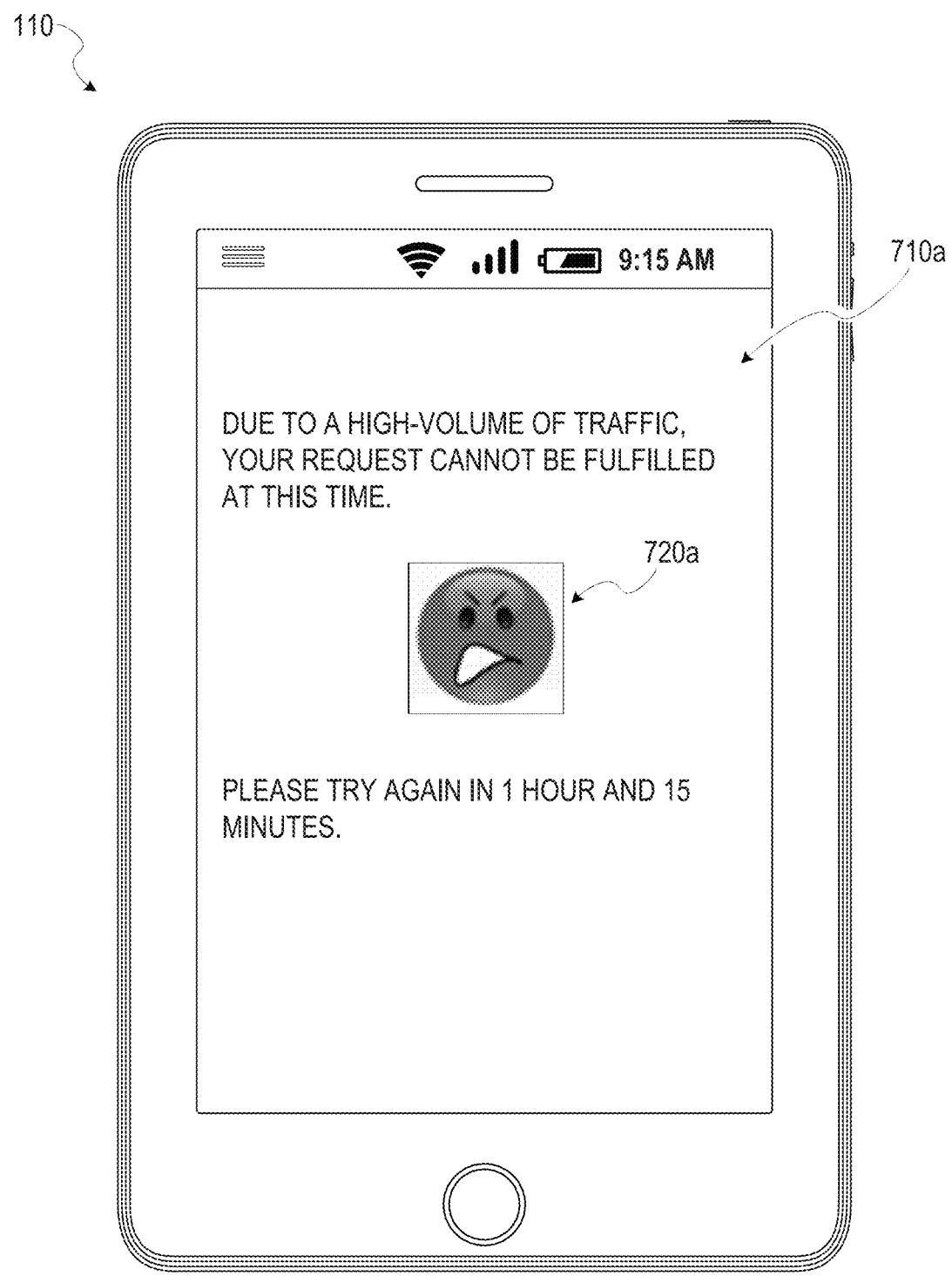
FIG. 7A illustrates an overload notification with an indication of a high overload level displayed on a client device, in accordance with some example embodiments.

FIG. 7A illustrates an overload notification 710a with an indication of a high overload level displayed on a client device 110, in accordance with some example embodiments. Although FIG. 7A shows client device 110 as a smartphone, it is contemplated that other types of client devices are also within the scope of the present disclosure, as previously discussed.

In some example embodiments, the indication can comprise overload data, such as a textual explanation of the high overload level and an indication of a time at which the user should request the operation again (e.g., "PLEASE TRY AGAIN IN 1 HOUR AND 15 MINUTES" in FIG. 7A). The indication can also comprise a graphic element 720a corresponding to the high overload level. The graphical element 720a can comprise a distinct graphic (e.g., angry facial expression for a high overload level) and/or color (e.g., red for a high overload level) corresponding to the high overload level.

Figure 7B:
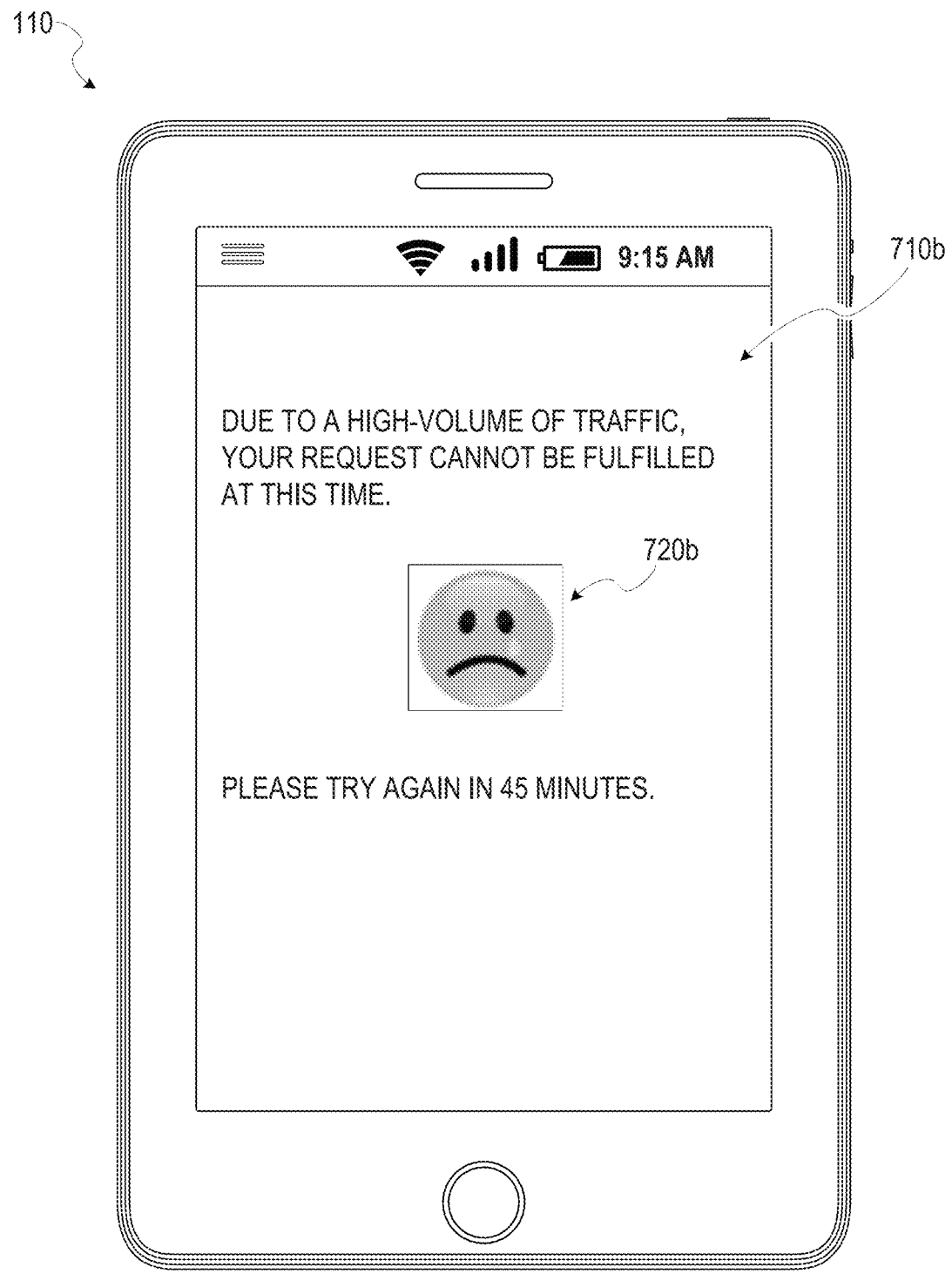
FIG. 7B illustrates an overload notification with an indication of a medium overload level displayed on a client device, in accordance with some example embodiments.

FIG. 7B illustrates an overload notification 710b with an indication of a medium overload level displayed on a client device 110, in accordance with some example embodiments. Although FIG. 7B shows client device 110 as a smartphone, it is contemplated that other types of client devices are also within the scope of the present disclosure, as previously discussed.

In some example embodiments, the indication can comprise overload data, such as a textual explanation of the medium overload level and an indication of a time at which the user should request the operation again (e.g., "PLEASE TRY AGAIN IN 45 MINUTES" in FIG. 7B). The indication can also comprise a graphic element 720b corresponding to the medium overload level. The graphical element 720b can comprise a distinct graphic (e.g., sad facial expression for a medium overload level) and/or color (e.g., gray for a medium overload level) corresponding to the medium overload level.

Figure 7C:
FIG. 7C illustrates an overload notification with an indication of a low overload level displayed on a client device, in accordance with some example embodiments.

FIG. 7C illustrates an overload notification 710c with an indication of a low overload level displayed on a client device 110, in accordance with some example embodiments. Although FIG. 7C shows client device 110 as a smartphone, it is contemplated that other types of client devices are also within the scope of the present disclosure, as previously discussed.

In some example embodiments, the indication can comprise overload data, such as a textual explanation of the low overload level and an indication of a time at which the user should request the operation again (e.g., "PLEASE TRY AGAIN IN 15 MINUTES" in FIG. 7C). The indication can also comprise a graphic element 720c corresponding to the low overload level. The graphical element 720c can comprise a distinct graphic (e.g., happy facial expression for a low overload level) and/or color (e.g., yellow for a low overload level) corresponding to the low overload level.

Although the example above use three different overload levels, it is contemplated that other numbers of overload levels are also within the scope of the present disclosure.

Referring back to FIG. 3, in some example embodiments, the overload determination module 310 is further configured to select a standard of restriction from a plurality of standards of restriction based on the determined overload condition(s), and the service module 320 is further configured to determine whether to allow or deny performance of the requested operation based on the selected standard of restriction. The plurality of standards of restriction can comprise different techniques and degrees of allowing the performance of the requested operation to users.

One example of a standard of restriction that can be employed is permitting the performance of the requested operation to users on a first-in-first-out (FIFO) queue system.

Another example of a standard of restriction that can be employed is permitting the performance of the requested operation to every Nth user in a queue system where N is a number (e.g., every second user in the queue, every third user in the queue, every fourth user in the queue), while denying the performance of the requested operation of the other users (e.g., redirecting them to a redirection page).

Another example of a standard of restriction that can be employed is permitting the performance of the requested operation to every user submitting a request during repeated time intervals (or windows) interspersed between periods of nonperformance. For example, the requested operation can be permitted for every user submitting a request during 30 second intervals, while users submitting a request outside of the intervals have their requested operations temporarily denied and those user being redirected to a redirection page until another attempt at requesting the operation is made. The interval time can be adjusted based on the overload condition(s). In some example embodiments, the length of the time interval is inversely proportional to the number of overload conditions or the overload level, such that the greater the number of overload conditions or the higher the overload level, the smaller the time interval (i.e., the more restrictive the traffic control system 150 is in permitting the requested operations).

In some example embodiments, the overload determination module 310 is further configured to divide a user into one of two groups in response to, or otherwise based on, receiving a request for the performance of an operation of the online service. The first group is for users who are granted permission to have their requested operation performed by the online service, while the second group is for users who are denied permission to have their requested operation performed by the online service. Users in the first group can be issued a second token (e.g., a permission token transmitted to the user's client device), which can be used by the traffic control system 150 to initiate the performance of the requested operation (e.g., requested page is loaded on user's client device). Users in the second group can be directed to a redirection page (e.g., the pages on which overload notifications 710a, 710b, and 710c are displayed in FIGS. 7A, 7B, and 7C, respectively). The overload determination module 310 can be configured to deny the performance of the requested operation until a return time parameter is satisfied (e.g., until a specified window of time occurs), at which time, the overload determination module 310 can permit the performance of the requested operation. In some example embodiments, the second token is an entrance token configured to grant a user access to an internal system, where the internal system is configured to perform the requested operation of the online service. The traffic control system 150 can act as a gateway to the internal system.

In some example embodiments, the overload determination module 310 is further configured to permit the performance of the requested operations for the users in the second group (e.g., the users that have had their requests denied) based on a determination that the return time parameter is satisfied. The overload determination module 310 can automatically cause the performance of the requested operation in response to the return time parameter being satisfied while the redirection page is loaded on the user's client device. In this fashion, the user simply has to wait until the return time parameter is satisfied. In some example embodiments, in response to a determination that the return time parameter has been satisfied, the overload determination module 310 can cause a selectable user interface element (e.g., a link) to be displayed to the user, where the selectable user interface element is configured to resubmit a request for the previously-requested operation in response to being selected by the user. In some example embodiments, the users in the second group are issued a first token and a return time parameter, which can be used to permit the performance of a requested operation when the requested operation is requested in accordance with the return time parameter, as previously discussed.

Figure 8:
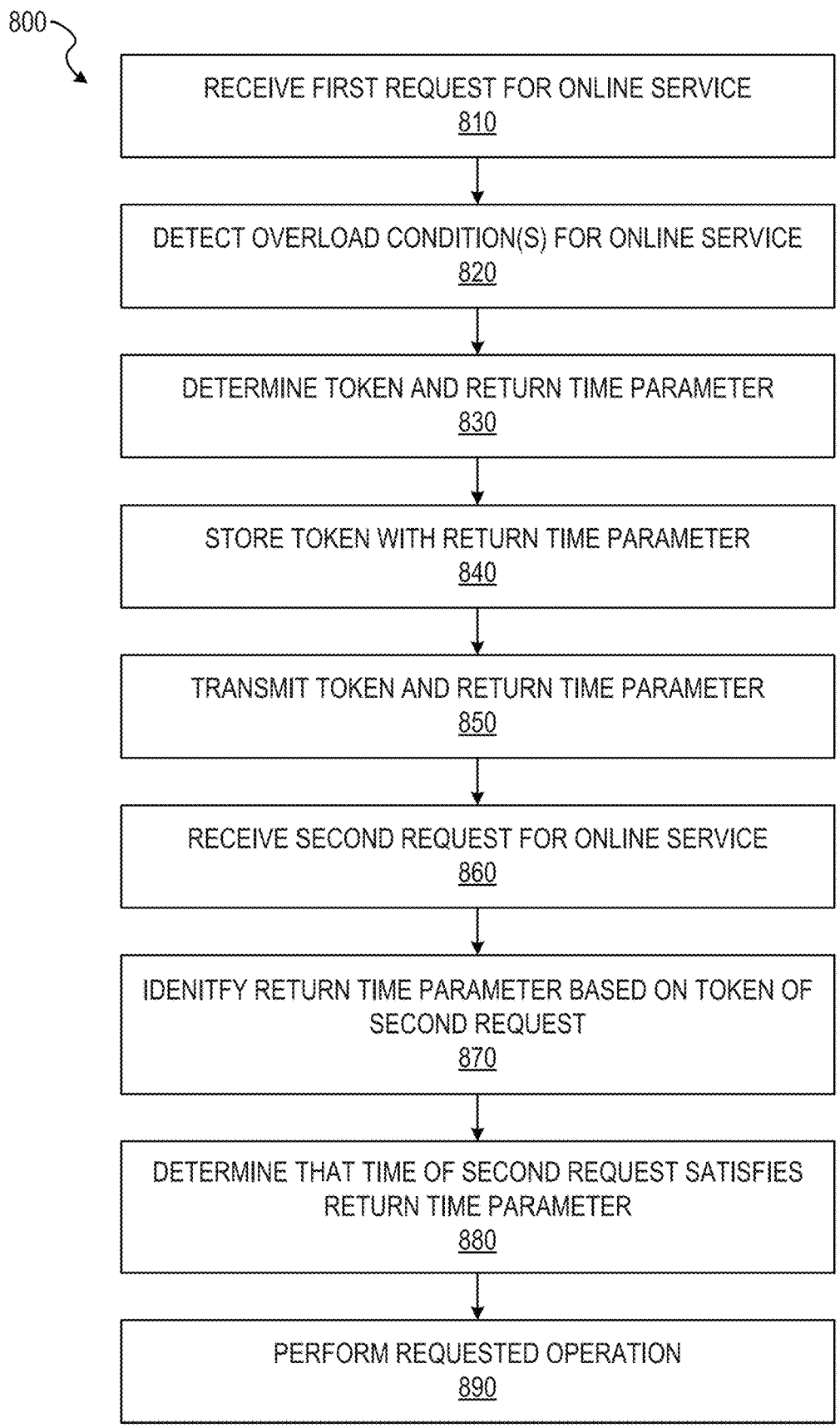
FIG. 8 is a flowchart illustrating a method of traffic control, in accordance with some example embodiments.

FIG. 8 is a flowchart illustrating a method 800 of traffic control, in accordance with some example embodiments. The operations of method 800 can be performed by a system or modules of a system. The operations of method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the traffic control system 150 of FIGS. 1 and 3, or any combination of one or more of its components or modules, as described above.

At operation 810, a first request for an online service to perform an operation can be received from a first user on a first client device. At operation 820, at least one overload condition for the online service can be detected, or otherwise determined, with the overload condition(s) corresponding to a first request time of the first request. At operation 830, a first token and a first return time parameter for the first user can be determined based on the determination of the overload condition(s). The performance of the requested operation can be denied in response to, or otherwise based on, the determination of the overload condition(s). At operation 840, the first token can be stored in association with the first return time parameter. At operation 850, the first token and the first return time parameter can be transmitted to the first client device. At operation 860, a second request for the online service to perform the operation can be received from the first user. The second request can have a corresponding time and comprise the first token. At operation 870, the first return time parameter can be identified based on the first token. At operation 880, a determination can be made that the corresponding time of the second request satisfies the first return time parameter. At operation 890, the operation can be performed in response to, or otherwise based on, the determination that the corresponding time of the second request satisfies the first return time parameter. It is contemplated that the operations of method 800 can incorporate any of the other features disclosed herein.

Figure 9:
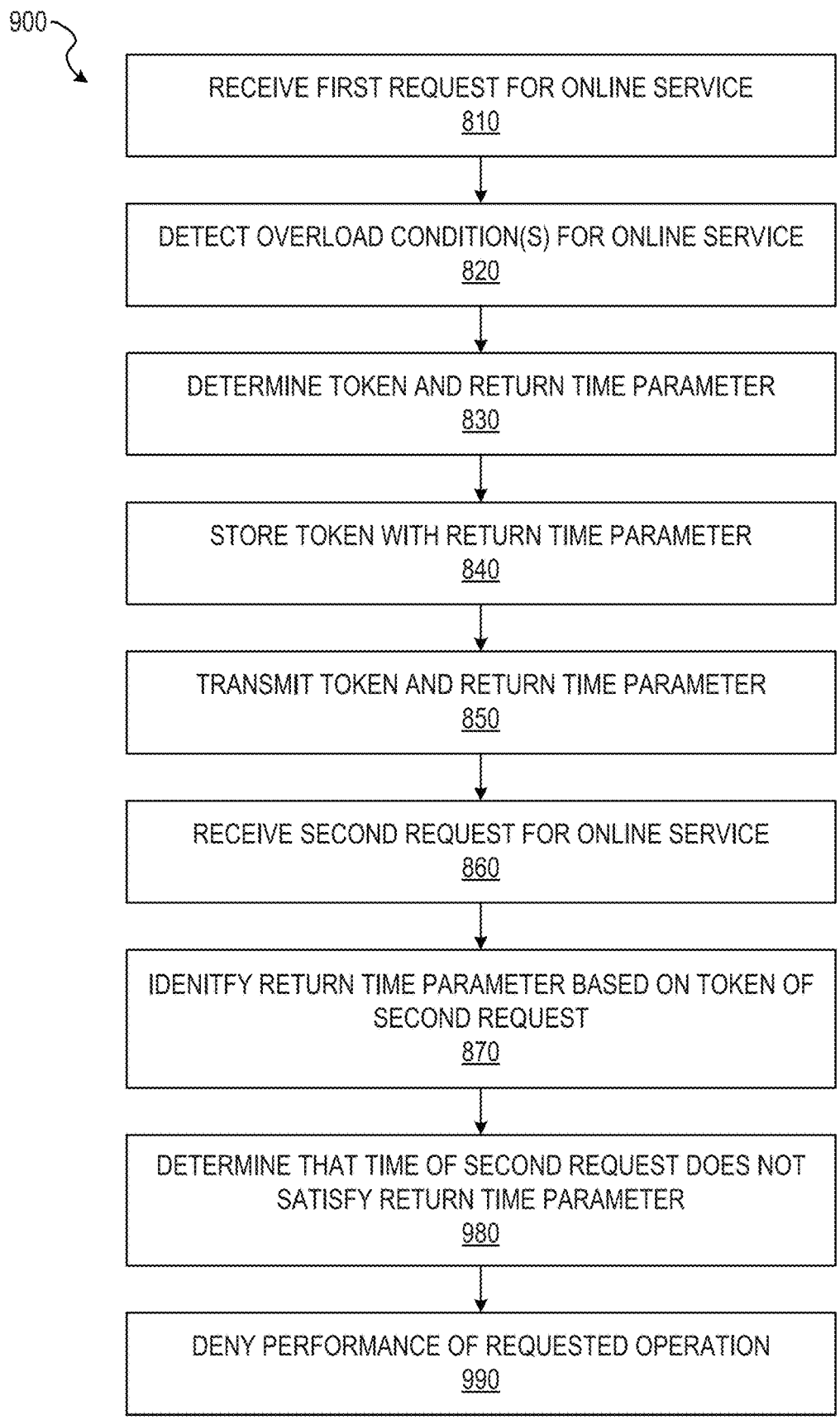
FIG. 9 is a flowchart illustrating another method of traffic control, in accordance with some example embodiments.

FIG. 9 is a flowchart illustrating a method 900 of traffic control, in accordance with some example embodiments. The operations of method 900 can be performed by a system or modules of a system. The operations of method 900 can be performed by processing logic that can comprise hardware (e.g., circuitry, dedicated logic, programmable logic, microcode, etc.), software (e.g., instructions run on a processing device), or a combination thereof. In one example embodiment, the method 900 is performed by the traffic control system 150 of FIGS. 1 and 3, or any combination of one or more of its components or modules, as described above.

Operations 810 through 870 in FIG. 9 can be the same as operations 810 through 870 in FIG. 8. At operation 980, a determination can be made that the corresponding time of the second request does not satisfy the first return time parameter. At operation 990, performance of the requested operation can be denied in response to, or otherwise based on, the determination that the corresponding time of the second request does not satisfy the first return time parameter. It is contemplated that the operations of method 900 can incorporate any of the other features disclosed herein.

Figure 10:
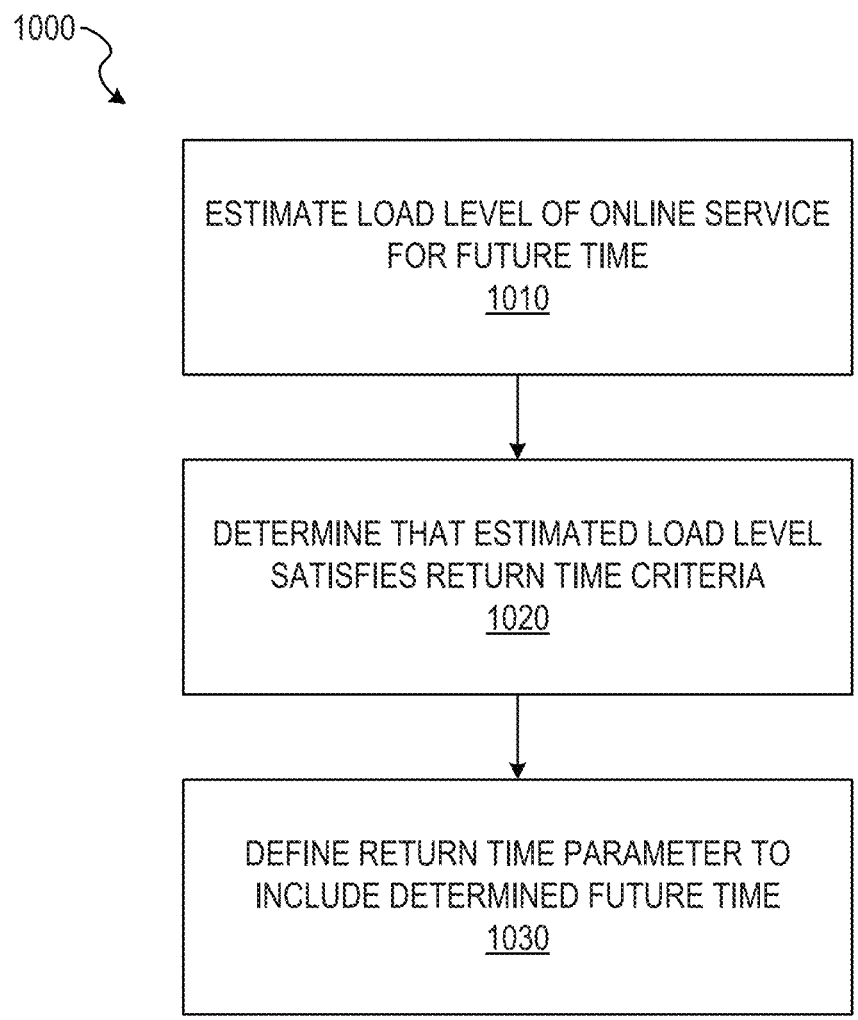
FIG. 10 is a flowchart illustrating a method of determining a return time parameter, in accordance with some example embodiments.

FIG. 10 is a flowchart illustrating a method 1000 of determining a return time parameter, in accordance with some example embodiments. The operations of method 1000 can be performed by a system or modules of a system. The operations of method 1000 can be performed by processing logic that can comprise hardware (e.g., circuitry, dedicated logic, programmable logic, microcode, etc.), software (e.g., instructions run on a processing device), or a combination thereof. In one example embodiment, the method 1000 is performed by the traffic control system 150 of FIGS. 1 and 3, or any combination of one or more of its components or modules, as described above.

At operation 1010, a load level of the online service for a future time can be estimated. At operation 1020, a determination can be made that the estimated load level satisfies one or more return time criteria. At operation 1030, the first return time parameter can be defined or set to include the future time based on the determining that the estimated load level satisfies the one or more return time criteria. It is contemplated that the operations of method 1000 can incorporate any of the other features disclosed herein.

Figure 11:
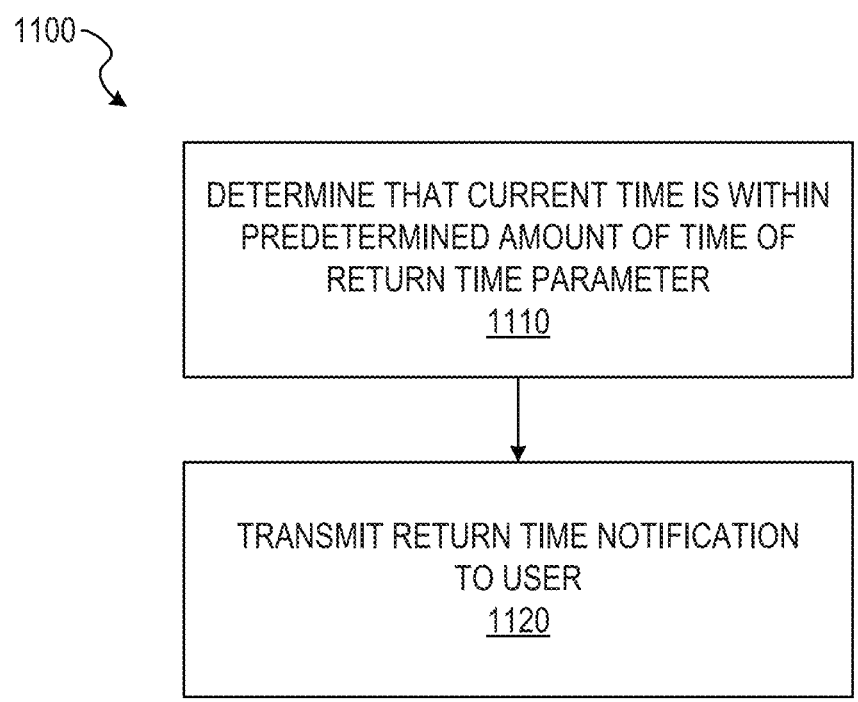
FIG. 11 is a flowchart illustrating a method of providing a return time notification to a user, in accordance with some example embodiments.

FIG. 11 is a flowchart illustrating a method 1100 of providing a return time notification to a user, in accordance with some example embodiments. The operations of method 1100 can be performed by a system or modules of a system. The operations of method 1100 can be performed by processing logic that can comprise hardware (e.g., circuitry, dedicated logic, programmable logic, microcode, etc.), software (e.g., instructions run on a processing device), or a combination thereof. In one example embodiment, the method 1100 is performed by the traffic control system 150 of FIGS. 1 and 3, or any combination of one or more of its components or modules, as described above.

At operation 1110, a determination can be made that a current time is within a predetermined amount of time of the first return time parameter. At operation 1120, a return time notification can be transmitted to the first user in response to, or otherwise based on, the determination that the current time is within the predetermined amount of time of the first return time parameter. The return time notification can be configured to indicate to the first user to request the operation again. It is contemplated that the operations of method 1100 can incorporate any of the other features disclosed herein.

Figure 12:
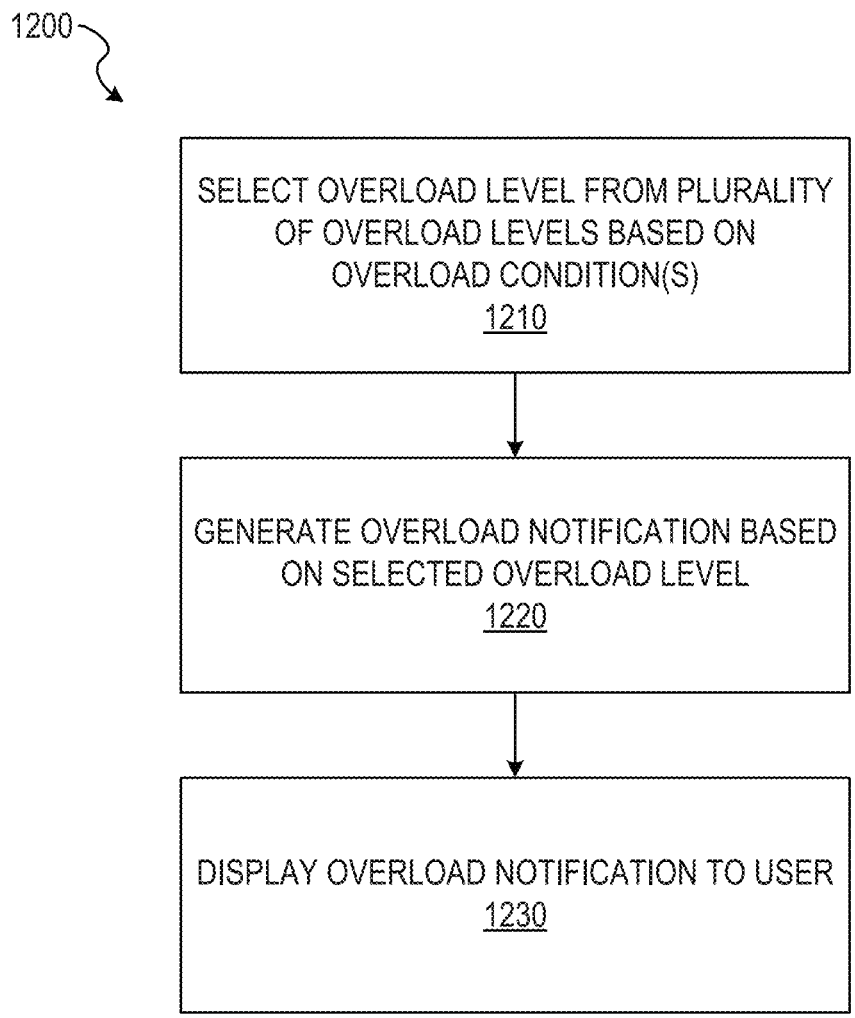
FIG. 12 is a flowchart illustrating a method of providing an overload notification to a user, in accordance with some example embodiments.

FIG. 12 is a flowchart illustrating a method 1200 of providing an overload notification to a user, in accordance with some example embodiments. The operations of method 1200 can be performed by a system or modules of a system. The operations of method 1200 can be performed by processing logic that can comprise hardware (e.g., circuitry, dedicated logic, programmable logic, microcode, etc.), software (e.g., instructions run on a processing device), or a combination thereof. In one example embodiment, the method 1200 is performed by the traffic control system 150 of FIGS. 1 and 3, or any combination of one or more of its components or modules, as described above.

At operation 1210, an overload level can be selected from a plurality of overload levels based on the overload condition(s). At operation 1220, an overload notification can be generated based on the selected overload level. The overload notification can comprise an indication of the overload level. At operation 1230, the overload notification can be caused to be displayed on the first client device. It is contemplated that the operations of method 1200 can incorporate any of the other features disclosed herein.

Figure 13:
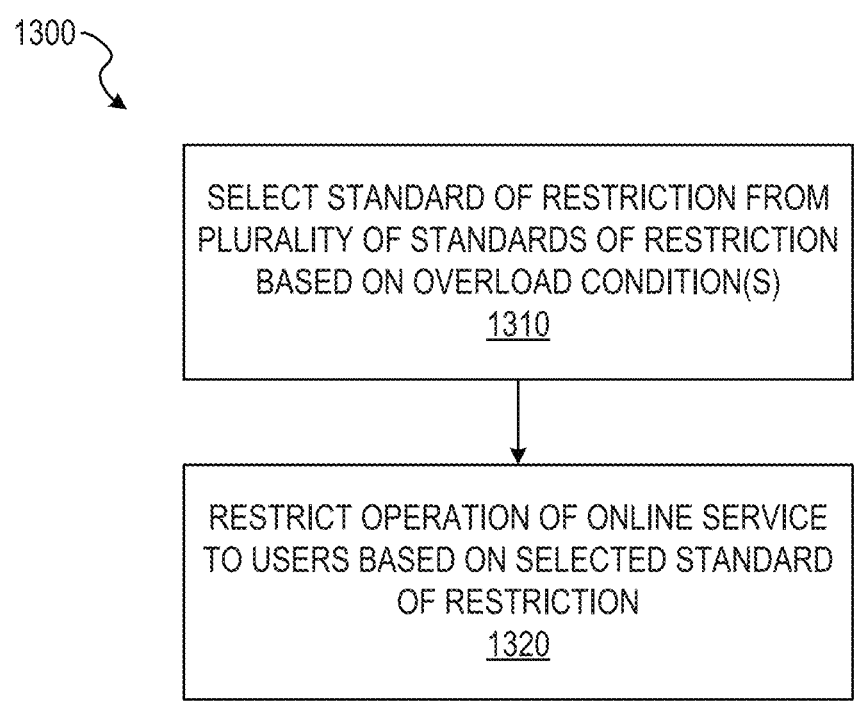
FIG. 13 is a flowchart illustrating yet another method of traffic control, in accordance with some example embodiments.

FIG. 13 is a flowchart illustrating a method 1300 of traffic control, in accordance with some example embodiments. The operations of method 1300 can be performed by a system or modules of a system. The operations of method 1300 can be performed by processing logic that can comprise hardware (e.g., circuitry, dedicated logic, programmable logic, microcode, etc.), software (e.g., instructions run on a processing device), or a combination thereof. In one example embodiment, the method 1300 is performed by the traffic control system 150 of FIGS. 1 and 3, or any combination of one or more of its components or modules, as described above.

At operation 1310, a standard of restriction can be selected from a plurality of standards of restriction based on the overload condition(s). At operation 1320, performance of requested operations of an online service can be restricted based on the selected standard of restriction. One or more users can be denied access to an operation of the online service based on the selected standard of restriction, while one or more other users can be allowed access to the operation of the online service based on the selected standard of restriction. It is contemplated that the operations of method 1300 can incorporate any of the other features disclosed herein.

Figure 14:
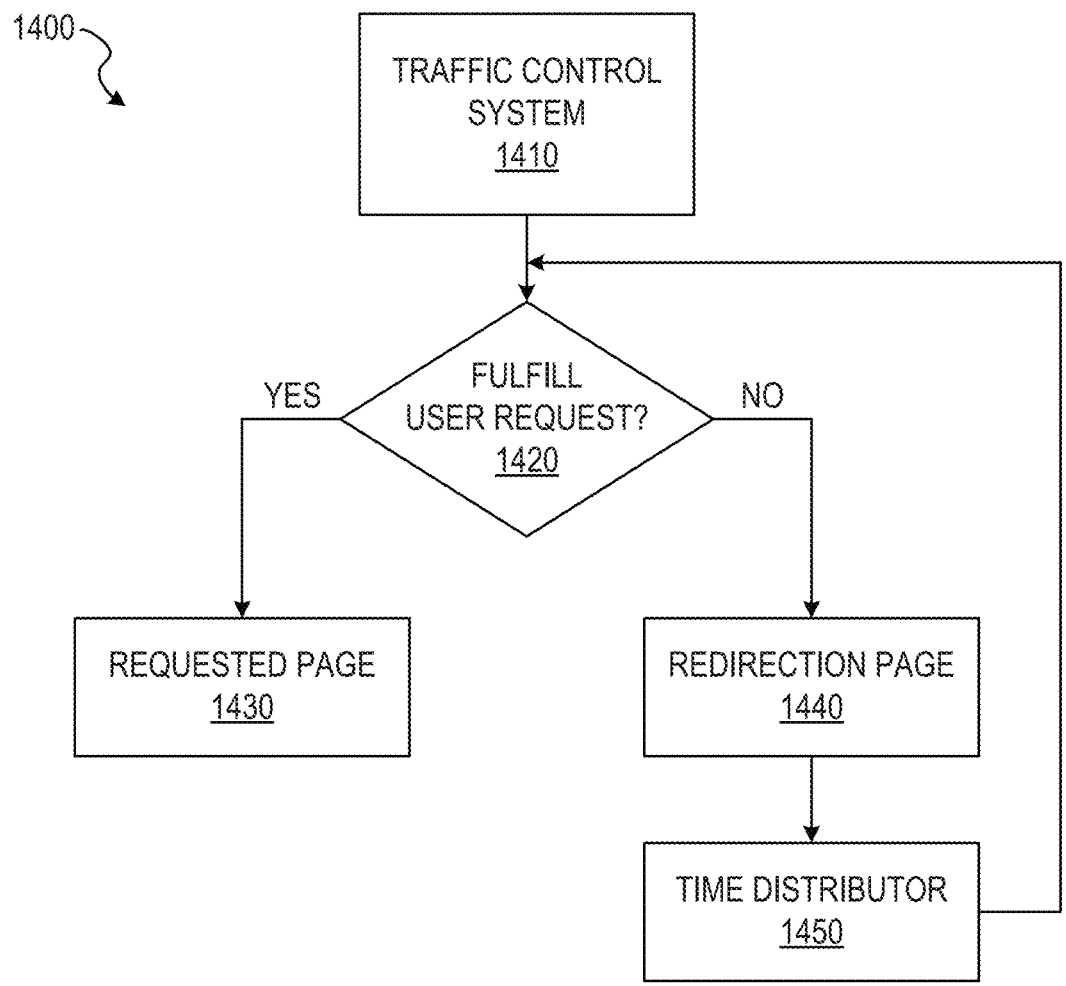
FIG. 14 is a flowchart illustrating yet another method of traffic control, in accordance with some example embodiments.

FIG. 14 is a flowchart illustrating yet another method of traffic control, in accordance with some example embodiments. The operations of method 1400 can be performed by a system or modules of a system. The operations of method 1400 can be performed by processing logic that can comprise hardware (e.g., circuitry, dedicated logic, programmable logic, microcode, etc.), software (e.g., instructions run on a processing device), or a combination thereof. In one example embodiment, the method 1400 is performed by the traffic control system 150 of FIGS. 1 and 3, or any combination of one or more of its components or modules, as described above.

At operation 1410, the traffic control system 150 is engaged by the user on a client device, such as by the user on the client device providing input (e.g., clicking a selectable user interface element) while the client device is interacting with a website. The input can include a submission of a request to access a page of the website (e.g., to load an item details page or an order page of the website).

At operation 1420, the traffic control system 150 determines whether or not to fulfill the user's request to access the page. This determination can be made based on a determination of whether any overload conditions are detected, and if so, how many and/or of what quality or degree, as previously discussed. If it is determined to fulfill the request, then, at operation 1430, the user is permitted to access the requested page. If it is determined to not fulfill the request, then, at operation 1440, the user is redirected to a redirection page. The redirection page can display an overload notification, including information indicating the overload condition(s), a return time parameter, and a user interface element indicating a status of the online service, as previously discussed.

At operation 1450, the traffic control system 150 employs a time distributor function to restrict the user from accessing the requested page until a determined time (e.g., the return time parameter). The user can then attempt again to access the page. At operation 1420, it is determined again whether or not to fulfill the user's request. The traffic control system 150 (e.g., the overload determination module 310) can determine an identification of the user, such as based on an internet protocol (IP) address of the user, and identify the corresponding return time parameter for the user based on the identification of the user. In some example embodiments, the user identification (e.g., the user's IP address) can be stored in association with the return time parameter in the database(s) 340. In this fashion, the user identification, such as the user's IP address, can be used to determine the appropriate return time parameter to use in deciding whether to allow access to the user during the user's repeated request, as an alternative to using an issued token.

In some example embodiments, the traffic control system 150 (e.g., the overload determination module 310) issues a cookie to users that are denied their request and redirected to the redirection page. The issued cookie can be stored on the user's client device. The traffic control system 150 can restrict the performance of the requested operation (e.g., entry or access to a particular page) using a script processor on the user's client device. The cookie on the user's client device can store the time at which the user enters the redirection page (e.g., the time at which the redirection page is loaded on the client device). The traffic control system 150 can then compare the current time of the user's attempt to resubmit the request (e.g., when the user attempts to enter or access the particular page again) with the time stored in the cookie. Using this comparison, the traffic control system 150 can determine whether the user's request is in accordance with the corresponding return time parameter, and thereby determine whether to deny the user's repeated request or grant the repeated request.

It is contemplated that the operations of method 1400 can incorporate any of the other features disclosed herein.

It is contemplated that any features of any embodiments disclosed herein can be combined with any other features of any other embodiments disclosed herein. Accordingly, these any such hybrid embodiments are within the scope of the present disclosure.

Figure 15:
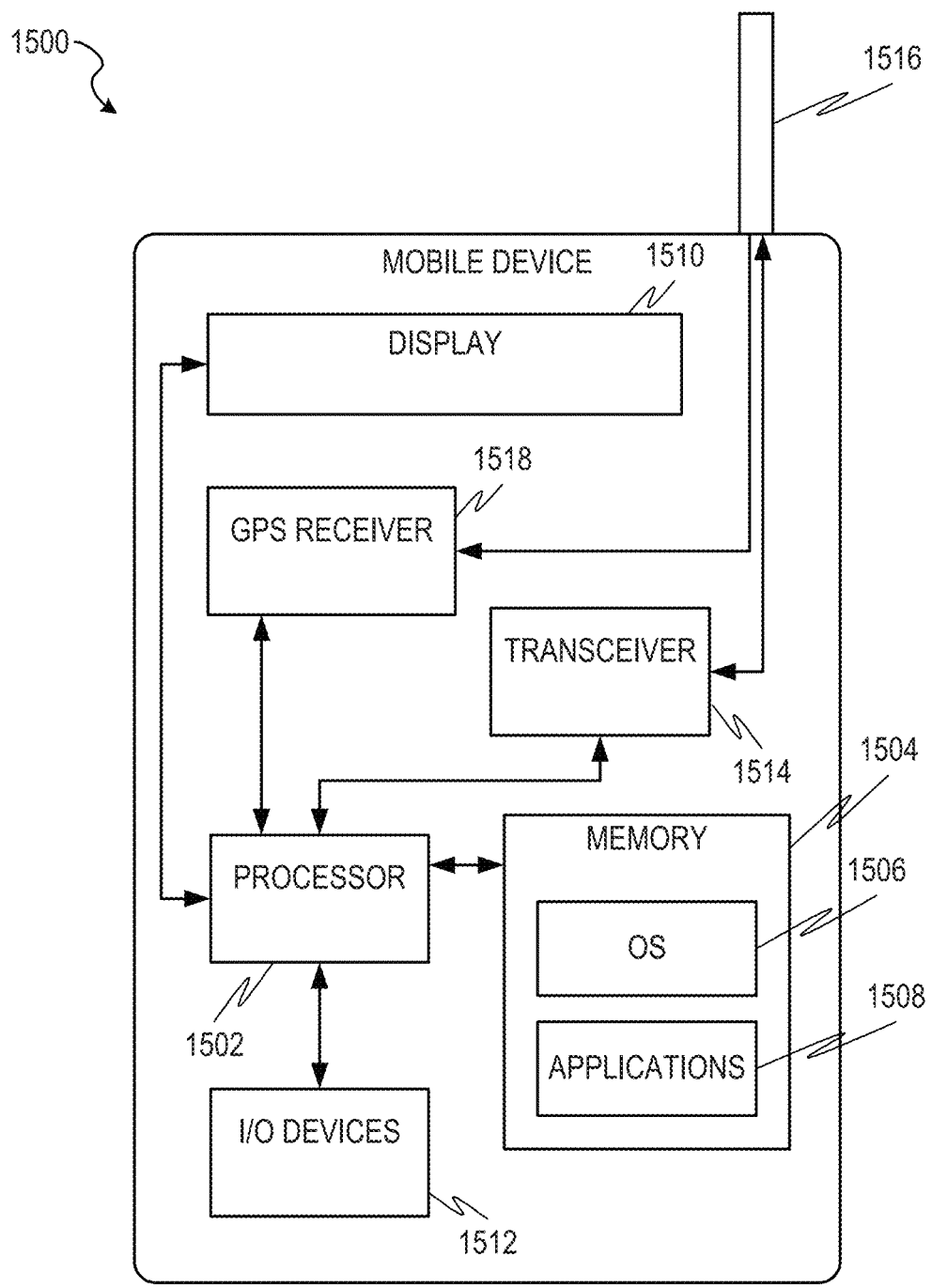
FIG. 15 is a block diagram illustrating a mobile device, in accordance with some example embodiments.

FIG. 15 is a block diagram illustrating a mobile device 1500, in accordance with some example embodiments. The mobile device 1500 can include a processor 1502. The processor 1502 can be any of a variety of different types of commercially available processors suitable for mobile devices 1500 (for example, an XScale architecture microprocessor, a Microprocessor without Interlocked Pipeline Stages (MIPS) architecture processor, or another type of processor). A memory 1504, such as a random access memory (RAM), a Flash memory, or other type of memory, is typically accessible to the processor 1502. The memory 1504 can be adapted to store an operating system (OS) 1506, as well as application programs 1508, such as a mobile location enabled application that can provide LBSs to a user. The processor 1502 can be coupled, either directly or via appropriate intermediary hardware, to a display 1510 and to one or more input/output (I/O) devices 1512, such as a keypad, a touch panel sensor, a microphone, and the like. Similarly, in some example embodiments, the processor 1502 can be coupled to a transceiver 1514 that interfaces with an antenna 1516. The transceiver 1514 can be configured to both transmit and receive cellular network signals, wireless data signals, or other types of signals via the antenna 1516, depending on the nature of the mobile device 1500. Further, in some configurations, a GPS receiver 1518 can also make use of the antenna 1516 to receive GPS signals.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-14 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the features of the present disclosure in different contexts from the disclosure contained herein.

Figure 16:
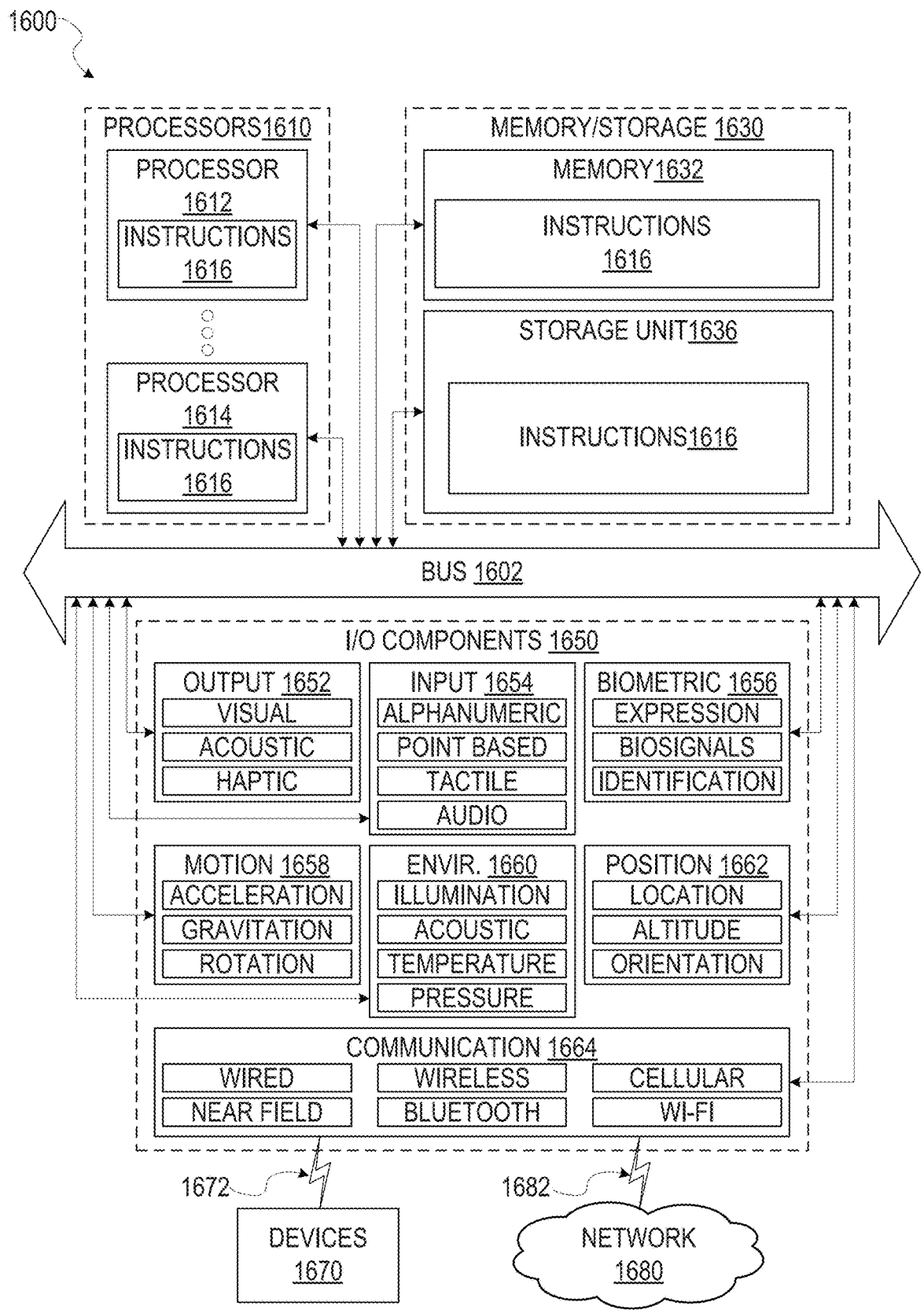
FIG. 16 illustrates a diagrammatic representation of a machine in the form of a computer system within which a set of instructions may be executed for causing the machine to perform any one or more of the methodologies discussed herein, according to an example embodiment.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example the instructions may cause the machine to execute the flow diagrams of FIGS. 11-14. Additionally, or alternatively, the instructions may implement the outage detection module 410, the listing identification module 420, and the management action module 430 of FIG. 4, and so forth. The instructions transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) may include, for example, processor 1612 and processor 1614 that may execute instructions 1616. The term "processor" is intended to include multi-core processor that may comprise two or more independent processors (sometimes referred to as "cores") that may execute instructions contemporaneously. Although FIG. 16 shows multiple processors, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 21@32 store the instructions 1616 embodying any one or more of the methodologies or functions described herein. The instructions 1616 may also reside, completely or partially, within the memory 1632, within the storage unit 21@36, within at least one of the processors 1610 (e.g., within the processor's cache memory), or any suitable combination thereof, during execution thereof by the machine 1600. Accordingly, the memory 1632, the storage unit 21@36, and the memory of processors 1610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672 respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1664, such as, location via Internet Protocol (IP) geo-location, location via Wi-Fi® signal triangulation, location via detecting a NFC beacon signal that may indicate a particular location, and so forth.

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
receiving, from a first user on a first client device, a first request for an online service to perform an operation;
receiving, from a second user on a second device, a second request for the online service to perform the operation;
detecting at least one overload condition for the online service, the at least one overload condition corresponding to a first request time of the first request;
selecting, by a machine having a memory and at least one hardware processor, based on the at least one overload condition, a standard of restriction from a plurality of standards of restriction, the plurality of standards of restriction comprising different techniques of controlling access to the operation, wherein the selected standard of restriction defines one or more selection criteria for selecting the first user or the second user; and
applying the selected standard of restriction to determine whether to deny or permit the first and second requests, the applying controlling access to the operation by denying the first user access to the operation based on the selected standard of restrictions and permitting the second user access to the operation based on the selected standard of restriction.

2. The computer-implemented method of claim 1, wherein the one or more criteria comprise use of a first-in-first-out (FIFO) queue system to permit access to the operation.

3. The computer-implemented method of claim 1, wherein the one or more criteria comprise identification of every Nth user in a queue system for access to the operation and identification of other users in the queue system for denial of access to the operation, N comprising a number.

4. The computer-implemented method of claim 1, wherein the one or more criteria comprise identification of every user requesting access during a defined time interval.

5. The computer-implemented method of claim 1, wherein the operation comprises at least one of presenting a page of the online service and processing a transaction.

6. The computer-implemented method of claim 1, wherein the at least one overload condition comprises a traffic level of the online service satisfying one or more predetermined traffic level criteria.

7. The computer-implemented method of claim 1, wherein the at least one overload condition comprises a network connection speed of the online service satisfying one or more predetermined network connection speed criteria.

8. The computer-implemented method of claim 1, wherein the at least one overload condition comprises a server speed of the online service satisfying one or more predetermined server speed criteria.

9. The computer-implemented method of claim 1, wherein the plurality of standards of restrictions from which the standard of restriction is selected comprises at least two of:
   permitting performance of the operation to users on a first-in-first-out (FIFO) queue system;
   permitting performance of the operation to every Nth user that submits a request for the operation;
   permitting performance of the operation to every user submitting a request during repeated time intervals interspersed with time intervals during which performance of the operation is denied.

10. The computer-implemented method of claim 1, wherein the selected standard of restriction comprises permitting performance of the operation to users on a first-in-first-out (FIFO) queue system.

11. The computer-implemented method of claim 1, wherein the selected standard of restriction comprises permitting performance of the operation to every Nth user that submits a request for the operation.

12. The computer-implemented method of claim 1, wherein the selected standard of restriction comprises permitting performance of the operation to every user submitting a request during repeated time intervals interspersed with time intervals during which performance of the operation is denied.

13. The computer-implemented method of claim 1, wherein the detecting the at least one overload condition comprises determining a level that the online service is overloaded, and wherein the selected standard of restriction is selected based on the determined level that the online service is overloaded.

14. The computer-implemented method of claim 1, wherein the plurality of standards of restrictions from which the standard of restriction is selected comprises:
   permitting performance of the operation to users on a first-in-first-out (FIFO) queue system;
   permitting performance of the operation to every Nth user that submits a request for the operation; and
   permitting performance of the operation to every user submitting a request during repeated time intervals interspersed with time intervals during which performance of the operation is denied.

15. A system comprising:
   at least one hardware processor; and
   a non-transitory computer-readable medium storing executable instructions that, when executed, cause the at least one processor to perform a set of operations comprising:
      receiving, from a first user on a first client device, a first request for an online service to perform an online operation;
      receiving, from a second user on a second device, a second request for the online service to perform the online operation;
      detecting at least one overload condition for the online service, the at least one overload condition corresponding to a first request time of the first request;
      selecting, based on the at least one overload condition, a standard of restriction from a plurality of standards of restriction, the plurality of standards of restriction comprising different techniques of controlling access to the online operation, wherein the selected standard of restriction defines one or more selection criteria for selecting the first user or the second user; and
      applying the selected standard of restriction to determine whether to deny or permit the first and second requests, the applying controlling access to the operation by denying the first user access to the online operation based on the selected standard of restriction and permitting the second user access to the online operation based on the selected standard of restriction.

16. The system of claim 15, wherein the at least one overload condition comprises a traffic level of the online service satisfying one or more predetermined traffic level criteria.

17. The system of claim 15, wherein the at least one overload condition comprises a network connection speed of the online service satisfying one or more predetermined network connection speed criteria.

18. The system of claim 15, wherein the at least one overload condition comprises a server speed of the online service satisfying one or more predetermined server speed criteria.

19. A non-transitory computer-readable medium storing executable instructions that, when executed, cause the at least one processor to perform a set of operations comprising:
   receiving, from a first user on a first client device, a first request for an online service to perform an online operation;
   receiving, from a second user on a second device, a second request for the online service to perform the online operation;
   detecting at least one overload condition for the online service, the at least one overload condition corresponding to a first request time of the first request;
   selecting, based on the at least one overload condition, a standard of restriction from a plurality of standards of restriction, the plurality of standards of restriction comprising different techniques of controlling access to the online operation, wherein the selected standard of restriction defines one or more selection criteria for selecting the first user or the second user; and
   applying the selected standard of restriction to determine whether to deny or permit the first and second requests, the applying controlling access to the operation by denying the first user access to the online operation based on the selected standard of restriction and permitting the second user access to the online operation based on the selected standard of restriction.

20. The non-transitory computer-readable medium of claim 19, wherein the one or more criteria comprise at least one of:

use of a first-in-first-out (FIFO) queue system to permit access to the online operation;
identification of every Nth user in a queue system for access to the operation and identification of other users in the queue system for denial of access to the operation, N comprising a number; or
identification of every user requesting access during a defined time interval.

* * * * *